US012761815B2

(12) United States Patent
Choudhary et al.

(10) Patent No.: US 12,761,815 B2
(45) Date of Patent: Oct. 13, 2026

(54) EFFICIENT ON DEMAND BLOCK GENERATION FOR A SPARSENESS AWARE FILE SYSTEM

(71) Applicant: Oracle International Corporation, Redwood Shores, CA (US)

(72) Inventors: Siddharth Choudhary, Belmont, CA (US); Boris Erlikhman, Mountain View, CA (US); Jingtao Xu, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/077,858

(22) Filed: Mar. 12, 2025

(65) Prior Publication Data

US 2026/0277455 A1 Sep. 17, 2026

(51) Int. Cl.
*G06F 3/06* (2006.01)
*G06F 16/182* (2019.01)

(52) U.S. Cl.
CPC ............ *G06F 3/0623* (2013.01); *G06F 3/064* (2013.01); *G06F 3/067* (2013.01); *G06F 16/1824* (2019.01)

(58) Field of Classification Search
CPC ........ G06F 3/0623; G06F 3/064; G06F 3/067; G06F 16/1824
See application file for complete search history.

(56) References Cited

U.S. PATENT DOCUMENTS 8,176,233 B1 * 5/2012 Karamcheti .......... G06F 12/109 711/170
12,566,679 B1 * 3/2026 Mizrachi ............. G06F 11/1451
2004/0177100 A1 * 9/2004 Bjorner ............... G06F 12/0253
2016/0085450 A1 * 3/2016 Ahn ........................ G06F 3/067 711/154

* cited by examiner

*Primary Examiner* — Jae U Yu
(74) *Attorney, Agent, or Firm* — Hickman Becker Bingham Ledesma LLP; Stephen J. Walder, Jr.

(57) ABSTRACT

A computer program product, system, and computer implemented method for an approach to provide for efficient on demand block generation for sparseness aware file system. The approaches are discussed in the context of a cluster the uses a distributed storage arrangement that manages objects using entries for snapshots and clones that are managed together. Specifically, the present disclosure provides for an approach where metadata for snapshots and clones of the object (e.g., extent) can be managed using a single set of metadata that intermingles entries for any number of snapshots and clones of the object (or subsets thereof) together. This is further combined with support for variable sized allocation units and tombstones (that represent sparse data using metadata), where those tombstones corresponding to data that can be generated on demand using application or file specific context generation logic to improve storage efficiency and reduce storage requirements.

20 Claims, 26 Drawing Sheets

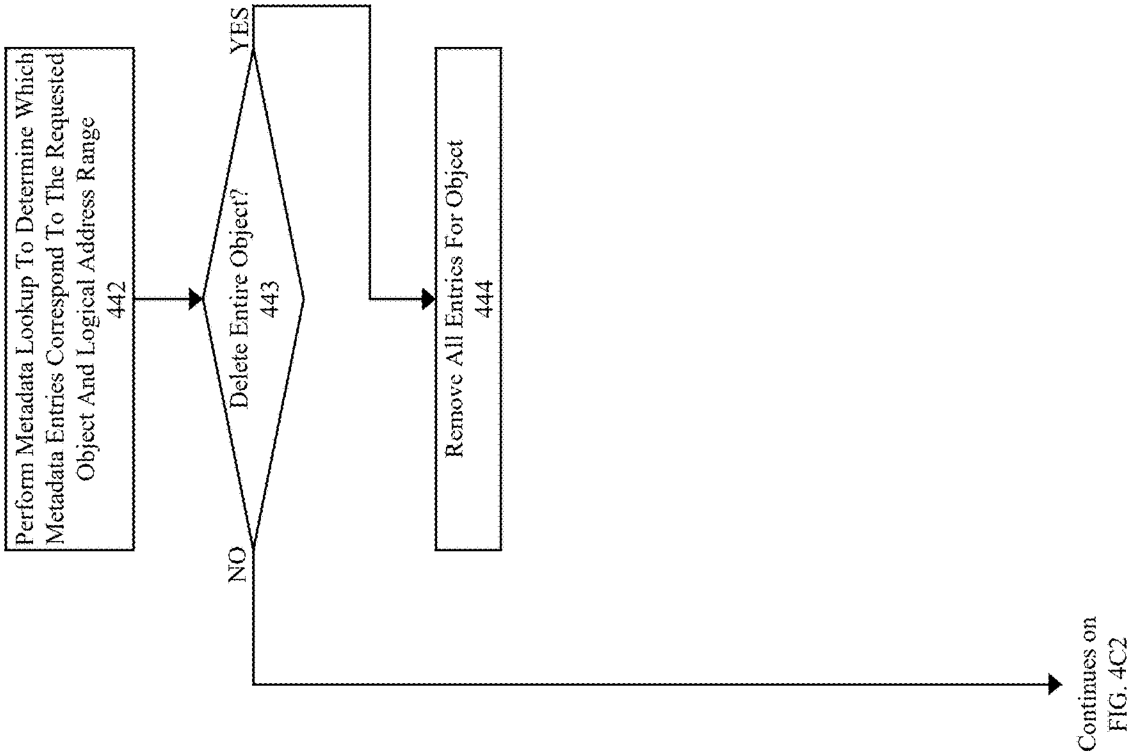
FIG. 4C1

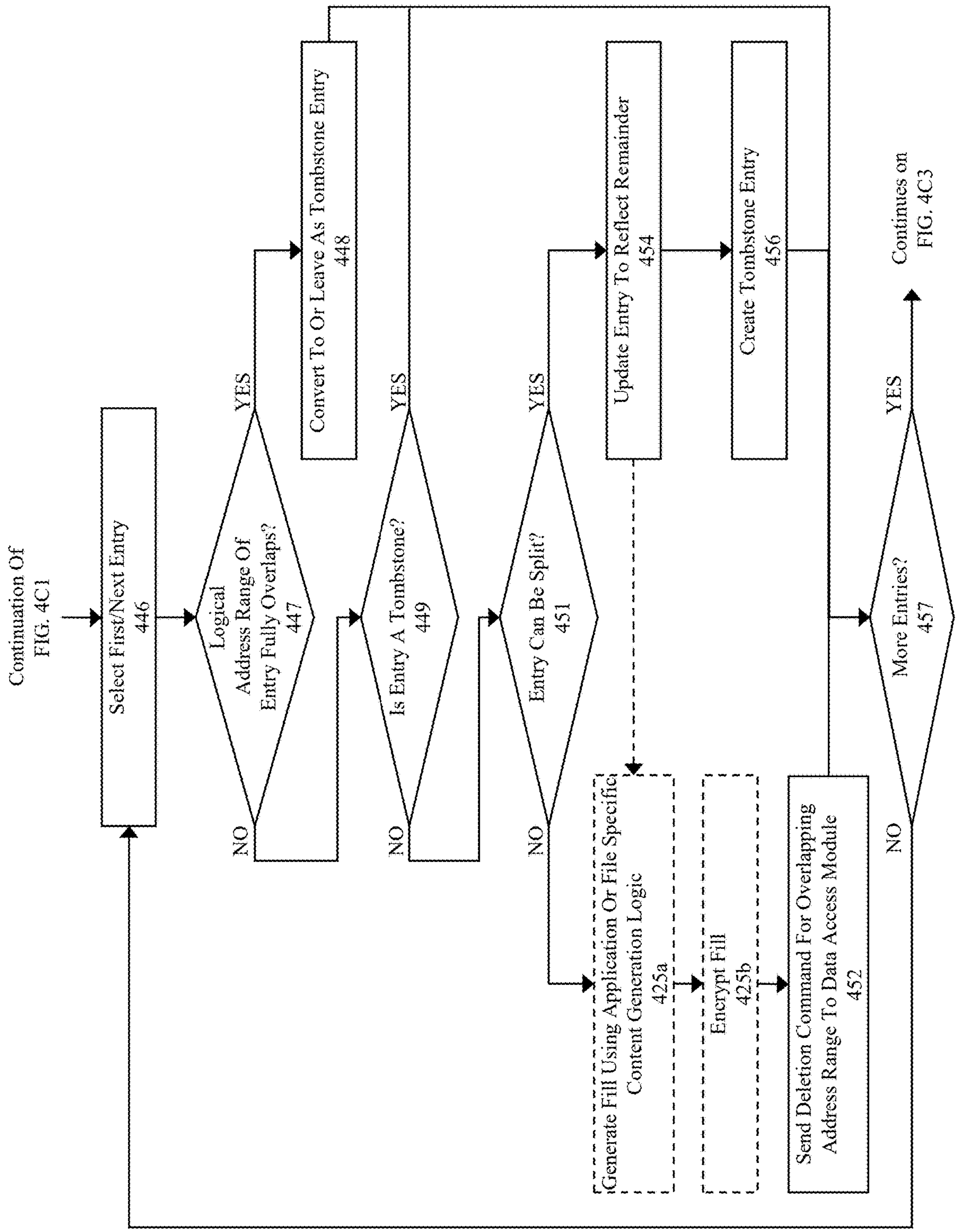
FIG. 4C2

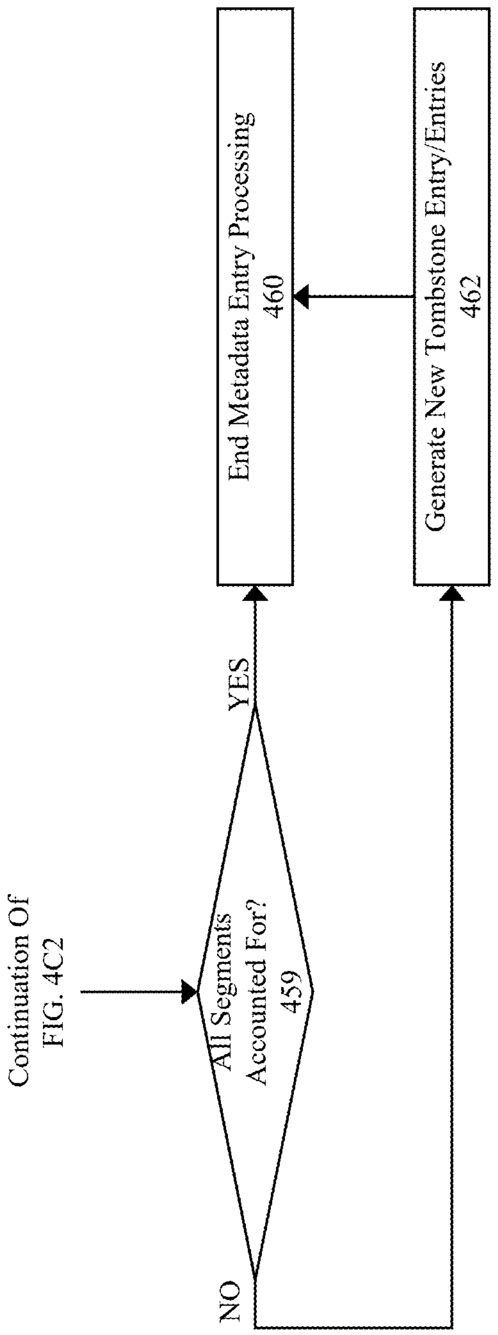
FIG. 4C3

Entry Table
510

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |
| s3 | Tombstone | 4 | 0 | |
| s4 | Regular | 2 | 2 | PA-s41 |

| Snapshot ID | Allocation Type | Allocation Size | Logical Offset | Physical Address |
|---|---|---|---|---|
| s0 | Regular | 1 | 0 | PA-s01 |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |
| s3 | Tombstone | 4 | 0 | |
| s4 | Regular | 2 | 2 | PA-s41 |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |
| s3 | Tombstone | 4 | 0 | |
| s4 | Regular | 2 | 2 | PA-s41 |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |
| s3 | Tombstone | 4 | 0 | |
| s4 | Regular | 2 | 2 | PA-s41 |

EFFICIENT ON DEMAND BLOCK GENERATION FOR A SPARSENESS AWARE FILE SYSTEM

RELATED APPLICATION

The present application is related to co-pending U.S. Patent Application Ser. No. 19/078,108 titled "DISTRIBUTED DATA STORE FOR EFFICIENT SNAPSHOT MANAGEMENT USING COLLOCATED METADATA", filed on Mar. 12, 2025, which is hereby incorporated by reference in its entirety.

BACKGROUND

The rise of database systems and their usefulness for collecting, managing, and analyzing data has led to their prevalence in modern society. For example, various types of database systems (e.g., file, object, extent, block, and relational database systems) have been developed for tracking and managing data for untold numbers of organizations. However, as the use of the database systems have spread, so has the reliance on those databases for the activities of the entities that use them.

Commensurate with this rise is also an increase in the consumption of the underlying storage resources thereof. This is particularly wasteful when the underlying data is merely a placeholder that could be reproduced. This is also further complicated by data retention operations such as the creation of snapshots, which has a multiplicative effect on the amount storage required to service the storage of data. For example, without more, ten snapshots of a single file with each snapshot representing only a small change to the file from a corresponding parent snapshot would utilize storage that is equal to roughly ten times the size of the file. This increase in storage consumption is particular notable in distributed storage systems where numerous customers are supported using a shared set of resources such a distributed data store. Given the vast amount of data to be stored, any improvements in the efficiency associated with storage of data can have significant impacts on storage consumption.

Therefore, there is a need for an improved efficiency in how distributed data stores manage data.

SUMMARY

Embodiments of the present disclosure provide a method, apparatus, and product for efficient on demand block generation for sparseness aware file system.

The approaches disclosed herein are directed towards an approach to provide for efficient on demand block generation for sparseness aware file system. The approaches are discussed in the context of a cluster the uses a distributed storage arrangement that manages objects using entries for snapshots and clones that are managed together. Specifically, the present disclosure provides for an approach where metadata for snapshots and clones of the object (e.g., extent) can be managed using a single set of metadata that intermingles entries for any number of snapshots and clones of the object (or subsets thereof) together. This provides for a single place in which the storage system can access extent information for a given extent to determine what information corresponds to a request (e.g., create, read, update, delete requests). This is further combined with support for variable sized allocation units and tombstones (that represent sparse data using metadata), where those tombstones corresponding to data that can be generated on demand using application or file specific context generation logic to improve storage efficiency and reduce storage requirements.

Further details of aspects, objects, and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

FIGS. 4A-4C3 illustrate approaches to entry processing to service storage node requests according to some embodiments.

DETAILED DESCRIPTION OF THE EMBODIMENTS OF THE DISCLOSURE

Figure 1:
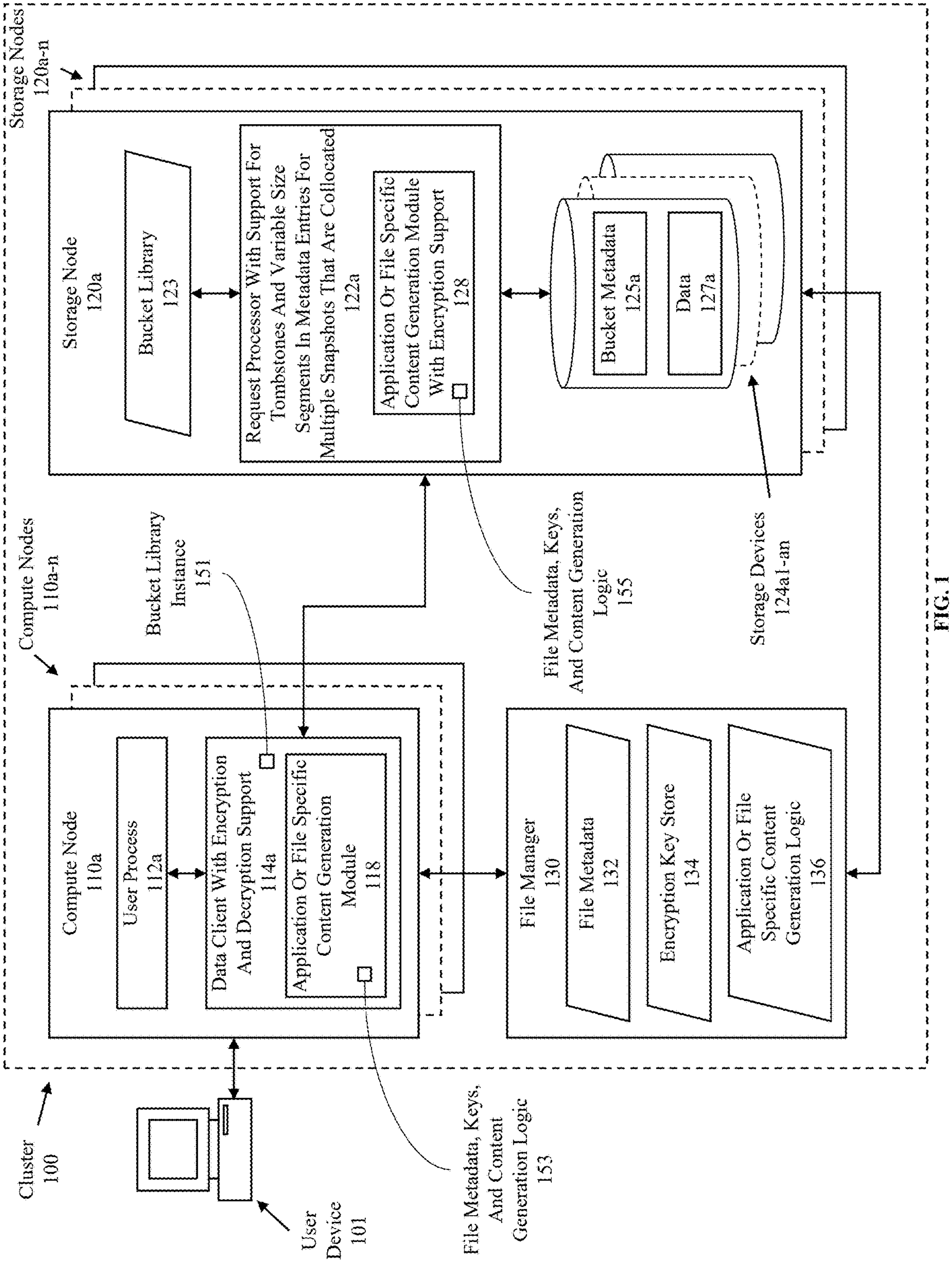
FIG. 1 illustrates an example system in which some embodiments of the disclosure may be implemented.

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Generally, the present embodiments are directed towards an approach to manage objects that tightly couples snapshots and cloning management together. Specifically, the present disclosure provides for an approach where metadata for snapshots and clones of the extent can be managed using a single set of metadata that intermingles entries for any number of snapshots and clones together. This provides for a single place in which the storage system can access extent information for a given extent to determine what information corresponds to a request (e.g., create, read, update, delete requests). As provided herein, an extent is a logical unit of storage space (storage unit). An extent may be constructed from a number of contiguous data blocks. The present disclosure discusses the approaches provided herein largely in the content on an extent. However, any appropriate contiguous storage unit could be used in place of an extent while still practicing the approaches disclosed herein.

Entries in the single set of metadata may be provided in any manner that is appropriate. For instance, each entry can identify a snapshot (read only copy of the extent) or clone (writable copy of the extent), a corresponding logical address range, a physical address range (when the entry references information on disk), and an entry type (e.g., regular or tombstone as will be discussed herein). Each entry may represent a whole or only a subset of the extent (e.g., if an extent is 1 MB then each entry may correspond to 8 KB, 16 KB 32 KB, 64 KB, 128 KB, 256 KB, 512 KB, or 1024 KB). In some embodiments, the size represented by each entry corresponds to a block size for underlying storage medium or a multiple thereof. In some embodiments, the largest possible contiguous allocation is selected to keep metadata to minimum. Additionally, a sparsity support feature is enabled by special entries called tombstones. Tombstones may be of any valid size (e.g., any of the variable sizes that are supported) but represent a logical absence of information or an initialization state. Such entries can be thought of as a hole in an extent where the information contained therein can be generated on the fly or comprises a static value or pattern fill (e.g., 0×BACACABA).

Using the above-described arrangement, the present approach can draw from a clone and any number of snapshots to determine the extent contents to be created, read, updated, or deleted. For example, a clone can comprise of copy of the extent from a parent snapshot with the exception of an updated 8 KB segment therein. Thus, a full extent read would return a copy of the parent snapshot with only the 8 KB segment replaced. Similarly, a clone can comprise of copy of the extent from a parent snapshot with the exception of an 64 KB segment therein that was replaced with a tombstone. Thus, a full extent read would return a copy of the parent snapshot with only the 64 KB segment replaced with a fill pattern or initialization values. In some embodiments, the tombstone may be represented logically in a response to a requestor to avoid transmitting the data generated by the fill pattern or initialization values (e.g., by identifying an offset, size, and pattern to be used). As provided herein any number of entries of different types can be provided as needed for efficient management of extents and snapshots and clones thereof. In some embodiments, the extent metadata and any data referenced are included within the same storage device.

Benefits of the approaches included herein comprise at least space efficiency. The additional space required to store a snapshot can be just the difference that exists between the snapshot and the parent version. Any logical space associated with a file but not used can be stored in a such a way that physical space is not committed. Along the same lines, the space that is used for tracking updated data (e.g., metadata) on snapshots/clones can equal to just what has changed to avoid wasted space. For example, according to various embodiments, if the update to the snapshot/clone is data deletion, which is releasing data (e.g., a file trim operation), no additional space is used since deleting is a space releasing operation.

In some embodiments, the distributed data store disclosed herein is optimized for snapshots. This includes at least collocation of an extent and all its associated snapshot and clone data on the same physical device. This provides multiple benefits. For example, it establishes a restricted failure domain for the extent and all its snapshots and clones that is only dependent on the availability of a single physical device; it improves I/O efficiency by enabling all the metadata to be easily consulted up front to determine where each individual fragment of the I/O needs to be served from; it allows for sharing derived metadata like a storage index, caches (e.g., columnar cache) by associating derived objects and caches with a common parent node; and it improves data relocation efficiency since all allocations relating to extent and its snapshots and clones are located at the same place (e.g., the extent and its snapshots and clones can be moved together in a packed manner optimizing network usage). In some embodiments, the derived objects and caches can be relocated with the extent. In some embodiments, metadata for the extent is logically consolidated (defragmented) to reduce the memory footprint of the metadata. Another improvement is that for complex operations like differential reads between associated snapshots, the effort only involves traversing metadata for I/Os in a way that is restricted to only the involve snapshots.

In some embodiments, data storage space is only allocated when a corresponding segment has been modified. As a result, file creation and file growth is instant (e.g., driven by the creation of metadata) since no space is materialized. Furthermore, a file initialization (such as one used for a database) can be converted into a metadata only operation since data that is unmodified can yield an expected pattern either encrypted (e.g., using an encryption key for the file) or unencrypted depending on the file property. By maintaining sufficient information to generate a desired pattern, storage materialization can be avoided. In fact, if all relevant file properties like encryption state (encrypted/unencrypted file status) and encryption keys are available to the storage on request, even encrypted files can benefit from the use of an expected pattern to generate desired blocks on demand for unmaterialized regions. This aspect is expanded to include dematerialization of allocated space on file trims, file shrink and re-initialization of data using pure metadata entries (e.g., tombstones as provided herein). In some embodiments, when sparse or partially sparse data is being read by client, sparse packing techniques are used to reduce network overhead in combination with client-side techniques to fill in (expand) the sparse information. In some embodiments, absence of any allocation corresponding to a logical address is treated as a read of an unmaterialized space (e.g., sparse read) and so always a predetermined pattern is returned as with a tombstone.

In some embodiments, metadata is organized into tree like hierarchy with every level associated with a logical entity.

The first level of the tree is the bootstrap essential block zero which contains information about all extent groups. The second level is extent groups which carry metadata information about every extent that belongs to a corresponding extent group. The third level corresponds to extents which contains all common information about the corresponding extent and contains information about all allocations associated with the extent and all its snapshots and clones. There are multiple benefits to this approach. For example, deletion is very fast since all it pertains to is severing a link and then freeing the allocation in-memory. Metadata can be updated using atomic operations (e.g., when metadata updates are the size of a disk sector). Additionally, this can be leveraged to simplify failure handling by first performing any necessary any data write allocations, followed by a metadata update to link the new allocation to the metadata tree.

In some embodiments, the metadata tree describes every single allocation of the device and is used to build a free map on the fly after bootstrapping and keeping it updated thereafter. Such a free map can be generated by at least reading all the disk locations that have been allocated to some extent or its snapshots or clones in the metadata tree. This eliminates the need for a persistent free map.

The disclosure herein provides approaches to further optimize the above techniques to support not only generation and management of fill but fill that is application specific, file specific, or some combination thereof. Such approaches further improve the functioning of the computing system at least be providing further utility of the sparsity awareness of the file system. In some embodiments, the approaches provided herein are further expanded to provide support for encryption of sparse and non-sparse information.

Thus, the present approach provides for increase storage efficiency (e.g., by avoiding duplication of data and providing increased granularity for allocation of storage. The present approaches will be discussed in the context of a system such as that illustrated in FIG. 1 and elsewhere herein.

FIG. 1 illustrates an example system in which some embodiments of the disclosure may be implemented. Generally, the example system includes a cluster having a number of nodes (e.g., storage nodes and compute nodes) that perform compute and storage functions on behalf of one or more users that access the cluster using one or more user devices. As provided herein, the cluster includes one or more mechanisms for managing sparsity within the system and generation of sparse information using application specific logic, file specific logic, or a combination thereof.

As illustrated, a cluster 100 includes a plurality of storage nodes (see 120*a*-*n*), a plurality of compute nodes (see 110*a*-*n*), and a file manager (see 130). As provided herein, the storage nodes (see 120*a*-*n*) together form a distributed data store that is accessible using a data client which may be located on a compute node (see e.g., 114*a*), where the file manager maintains information that can be used by the compute nodes and the storage nodes to access and generate content as part of servicing content access requests. Additionally, the cluster is accessible via user devices (see e.g., user device 101) through the compute nodes.

As an initial matter, a user device (e.g., 101 interacts with data storage (see e.g., 127*a* on storage devices 124*a*1-*an*) via a compute node (e.g., 110*a*) using one or more sessions. The user device 101 comprises any type of computing device that may be used to operate or interface with the storage node(s), whether directly or indirectly. Examples of such a computing device include workstations, personal computers, laptop computers, or remote computing terminals. Computing devices may also comprise any type of portable tablet device, including for example, tablet computers, and portable readers. Computing devices may also include any mobile device that can suitably access any computing systems on the Internet such as smartphones and mobile handsets. It is noted that this disclosure is not limited in its application to just these types of devices. The embodiments of the disclosure are applicable to any computing device that works in conjunction with access to digital information stored on, as an example, the Internet. One of ordinary skill in the art may appreciate that embodiments of this present disclosure may be implemented on the Internet, on a closed network, on a hybrid open and closed network, or on a cloud network.

Furthermore, the user device can be controlled by a user, another service, an administrator, or comprise any other user device that allows for access or management of data. Additionally, a distribute data store may be associated with any number of users via one or more compute nodes that are each in turn associated with one or more user devices such as user device 101. In some embodiments, a compute node or user device may be combined together.

As provided herein, compute nodes (see e.g., 110*a*-*n*) execute one or more user processes (see e.g., 112*a*). Generally, such processes are executed on a session-by-session basis, where a user may start a session with a compute node and control the execution of one or more workflows or processes. As part of the performance of those workflows or processes, the user process may generate requests to perform file operations. For example, the user process may cause requests such as filed creation, file initialization, file open, file read, file write, or file delete (e.g., trim) operations. Such request would be forwarded to a corresponding data client on the node (e.g., 114*a*) to perform the requested operation.

In some embodiments, the data client interacts with a file manager see e.g., 130 to retrieve relevant file metadata for determining which node(s) would be used for storing data for a corresponding file. For example, a database ID, a block size, and a file type, can be used by the data client to perform a corresponding lookup against a set of information for determining where file contents can be located. For instance, the data client can include a bucket library instance (e.g., 151) that can be used to determine which buckets may contain or be used to contain the file contents—e.g., by calculating an offset of the file and using that offset to lookup the corresponding bucket(s). Subsequently, a hashing algorithm can be used to determine which disks have the corresponding bucket(s). Based on this information the data client (e.g., 114*a*) generates one or more storage node requests that are transmitted to the corresponding storage node(s). In some embodiments, the data client sends storage node requests to multiple storage nodes of the distributed data store. In some embodiment, the data client receives responses from multiple storage nodes of the distributed datastore and aggregates those response to form a response to the file request—e.g., where different portions of the request correspond to different extents in different buckets on different storage nodes.

When a storage node request is received at a storage node it is routed to a request processor therein (see e.g., 122*a*). As provided herein, the request processor supports both tombstones and variable size segments. The support for multiple entries for each extent where those entries may be of different sized and may represent different segments of the extent provides for an efficient manner to represent an extent snapshot or clone thereof. Each storage node request will correspond to at least one object (e.g., an extent).

For instance, many files change over time. Upon creation of a file a set of metadata can merely specify the existence of a file. Such an entry can be represented solely in a file manager (see e.g., file manager 130 and file metadata 132). Before a first use, the file would be initialized (e.g., by creating a header, adding fill to the body, and a footer indicating the end of the file). If this file is represented in one or more extents, the header and footer can be efficiently represented using entries of a smallest available size (e.g., 8 KB) that is backed by a physical storage device. The remainder of the file can be represented using a tombstone that describes the size of the body and is associated with a fill pattern but is not backed by a physical storage device. Such fill can comprise any appropriate generatable information such as a pattern or a static value which may be application or file specific, or some combination thereof. Furthermore, the fill may be content and context aware and be generated based on a set of rules or logic (see further discussion below). Using this approach, an extent would only consume two 8 KB sized storage region (e.g., blocks) on a physical disk with the remainder being saved (e.g., if the extent is 1 MB then the saved physical storage space is 1024 KB−2*8 KB=1008 KB). As data is written to the extent storage from the backing storage device is allocated for storage of that information and entries are generated in the metadata for the extent. Snapshots can be taken at any time (essentially by merely changing a current clone/snapshot ID), and requests can be processed using information from any number of entries as appropriate (e.g., the clone of an extent can comprise information from one or more parent snapshots and from the clone itself). Additional details will be discussed further herein.

Upon receipt of such a request, each storage node will determine how to process the user request by accessing one or more of a bucket library (see e.g., 123) or bucket metadata (see 125*a*). Generally, the bucket library is the same as the bucket library instance. However, the bucket library instance on the compute node will only include the information that is relevant to the particular compute node. For instance, a subset of the bucket library that is relevant to users that are associated with a current session with the compute node. In contrast one or more storage nodes will include a larger portion of the bucket library.

The request processor 122*a*, processes the corresponding bucket metadata (see 125*a*) which comprises at least the discussed entries and may further comprise relationship information that enables the request processor to determine interrelationships between clones and snapshots, and between snapshots and snapshots. This information can be used to determine the content of a logical address range that corresponds to an access request to an extent (whether the whole or only part of the extent) as will be discussed herein.

In some embodiments, Applicant or file specific content generation modules are provided at compute nodes and storage nodes (see e.g., 118 and 128). General, these modules provide dynamic content generation processes that use corresponding application specific content generation logic (see e.g., 136 and 153). For instance, the content generation module 118 uses file metadata to identify a corresponding file and corresponding content generation logic to determine how to generate contents that is not materialized. Generally, file contents created at initialization follow a known format. For example, the contents can comprise a header that includes file metadata providing information that describes one or more attributes of a file. Similarly, the contents can comprise a footer that includes file metadata such as a checksum value and an end of file indicator. The remainder of the file (e.g., body) will often comprise fill information which can also be application or file specific. The present approach leverages the knowledge of the file state at initialization to create corresponding files using one or more entries where those entries may include one or more tombstones as provided herein. Subsequently, when the contents are required, a corresponding process can generate those contents dynamically. For example, after sending a read request to a storage node, the requesting compute node can receive a response that indicates that at least some of the requested contents were not materialized (e.g., in a vector that identifies one or more segments as sparse). Subsequently, the Application or file specific content generation module (see e.g., 118) dynamically materializes (generates) the contents that were not materialized using corresponding content generation logic that was previously stored on the compute node. Similarly, if a compute node sends a write request to a storage node and that write request would result in a storage allocation that would encompass a non-materialized portion, an application or file specific content generation module at the storage node (see e.g., 128) would generate the corresponding contents using corresponding content generation logic stored on the storage node. In some embodiments, the application or file specific content generation module (see e.g., 128) includes encryption support and uses that encryption support to encrypt the dynamically generated portion prior to storage. For example, the portion can correspond to a body of the file which is first generated using the content generation logic. Subsequently, the file metadata (see e.g., 155 and 132) is used to perform a lookup in an encryption key store (see e.g., 155 and 134) to determine an encryption key to use on the dynamically generated contents. In this way, the data stored on the storage nodes is maintained in an encrypted form. Additionally, the data client (see 114*a*) with encryption and decryption support, when indicated, uses corresponding encryption keys to encrypt data before it is sent to a storage node and decrypts data that is received from the storage node(s).

File manager 130 provides a repository for storage relevant file information to enable the herein disclosed techniques. For instance, file metadata (see e.g., 132) is maintained to provide information to perform operations on the bucket library instance to determine corresponding locations where information may be stored for a particular file (or extent thereof). Additionally, the file metadata can be used to identify information necessary to identify the corresponding subset(s) of application or file specific content generation logic (see e.g., 136). For example, an application identifier, file identifier, or a combination thereof can be used to perform a lookup in the content generation logic (see 136) to identify the subset therein that corresponds to the file and which can be used to dynamically generate content thereof. Similarly, the file metadata can be used to identify information necessary to perform lookups on the encryption key store (see e.g., 134). For example, an application identifier, file identifier, or a combination thereof can be used to perform a lookup in the encryption key store to identify corresponding encryption keys. The file manager 130 may be located on any of the nodes of the computing cluster such as the compute nodes 110*a-n*, the storage nodes 120*a-n*, or on a separate node. Such information can also be reproduced at the compute nodes when indicated. For example, upon file creation, initialization, or open, the relevant file metadata, encryption store information, and application or file specific content generation logic can be reproduced on the compute node (see e.g., 153). Similarly, relevant file metadata, encryption store information, and application or file specific content generation logic can be reproduced on the storage node(s) (see e.g., 155) upon file initialization or open, or in response to an access request.

In some embodiments, the metadata for an extent (see e.g., bucket metadata 125*a*) and the data that the extent references may be located on the same physical storage device (see e.g., data 127*a*). As provided herein, each storage node may include any number of storage devices (see e.g., 124*a*1-*an*) which may be of any appropriate type (e.g., HDD or SSD). Entries within the bucket metadata can then reference physical storage location on the same storage device that contain the relevant data.

Figure 2:
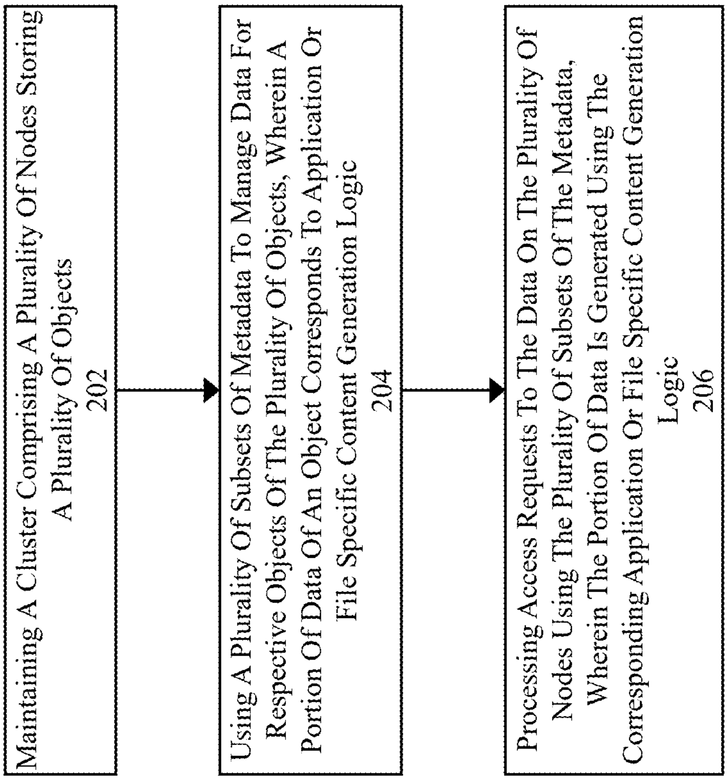
FIG. 2 illustrates a flow for efficient on demand block generation for a sparseness aware file system using efficient database snapshots in a distributed data store according to some embodiments.

FIG. 2 illustrates a flow for efficient on demand block generation for a sparseness aware file system using efficient database snapshots in a distributed data store according to some embodiments. Generally, the approach comprises maintaining a cluster comprising nodes that store a plurality of objects, using a plurality of subsets of metadata to manage data for respective objects of the plurality of objects where a portion of the object can be generated on demand using application or file specific content generation logic, and processing access requests to the data on the plurality of storage nodes using the plurality of subsets of the metadata, wherein the first portion of the data is generated using corresponds to the application or file specific content generation logic.

At 202, a cluster comprising a plurality of nodes stores a plurality of objects. For example, each node of a plurality of nodes stores a collection of extents. Each collection of extents is managed using a given bucket (metadata bucket) and corresponds to a file. Each bucket can be used to perform a lookup operation to determine the content(s) or locations of content of the extent that are relevant to a received request.

Specifically, at 204 a plurality of subsets of metadata can be used to manage data for respective objects of the plurality of objects. One or more portions of a respective object can correspond to sparse information and be represented using a subset of metadata as a tombstone entry as provided herein. Further, such an entry also corresponds to application or file specific content generation logic. In the event that a request requires that data corresponding to a tombstone be materialized (e.g., a read, write, delete (e.g., trim or reinitialize)), the process dynamically generates the data corresponding to the tombstone using the application or file specific content generation logic. Such approaches can be combined in the context of the cluster. For example, each subset of the plurality of subsets corresponds to an extent, and individual extents correspond to individual objects of the plurality of objects. Snapshots of the objects and their extents may be taken at any time, and the metadata for those snapshots can be maintained within the same subset. As will be discussed further herein, the metadata within a subset can be used to determine the relevant portion(s) of data necessary to service a request regardless of whether those portions are determined using information from a single snapshot or multiple snapshots. Additionally, further optimizations are provided herein such as the use of tombstones to indicate holes and variable size segments for maintaining information to represent portions of the extent.

At 206, the plurality of subsets of metadata are used to provide for processing of access requests to the plurality of storage nodes. Such processing generally comprises using an identifier (e.g., snapshot identifier) to determine relevant entries and constructing a response based on those entries. When such an access request necessitates that not currently materialized data be materialized, the data is generated using the corresponding application or file specific content generation logic. Further details are provided herein.

Figure 3:
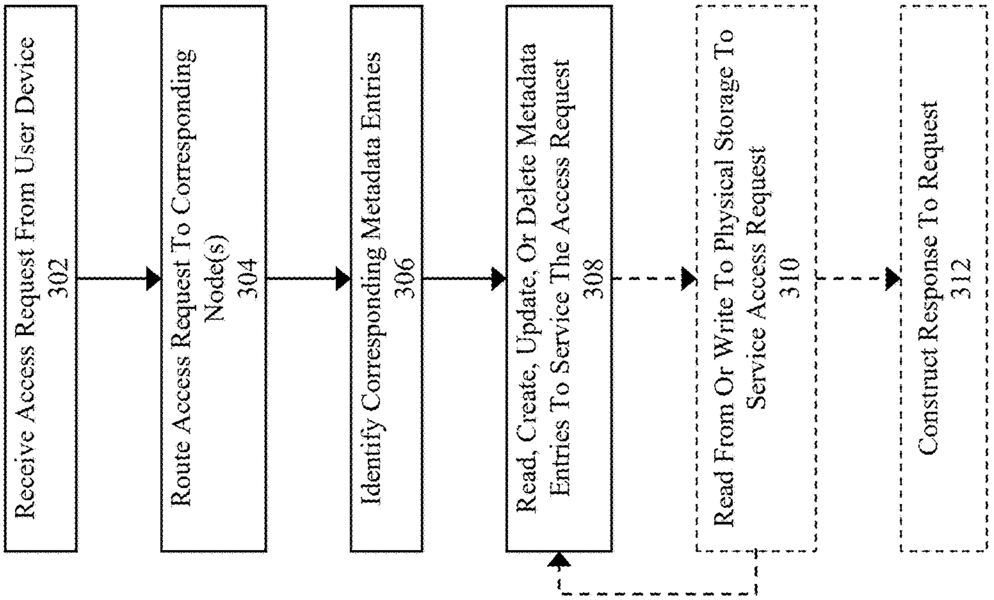
FIG. 3 illustrates a flow for processing request to the distributed data store according to some embodiments.

FIG. 3 illustrates a flow for processing a request to the distributed data store according to some embodiments. Generally, the approach provided herein uses application or file specific content generation logic, when combined with a sparseness aware file system, to dynamically generate content using application or file specific content generation logic. Such an approach may further comprise receiving an access request from a user device, routing the access request to the corresponding nodes, identifying the corresponding metadata entries, performing the requested operation. Some embodiments also include reading from or writing to physical storage and constructing a response to a request.

Generally, a request is received from a user device (see e.g., 302). For instance, a user device that is connected to a compute node using a currently active session can send a request to access to a file. That access request is routed to the corresponding node(s) at 304. For example, a data client performs a lookup on a bucket library instance to determine which storage device(s) include or may include the requested data and forwards a corresponding request(s) (storage node request(s)) to the storage nodes having the identified storage device(s) based on at least the bucket library instance information (see e.g., 151).

Upon receipt of a storage node request at a storage node a subset of metadata is processed to identify metadata entries therein that are relevant to the request at 306. For example, extent identification information can be used to determine which subset of the plurality of subsets of metadata are potentially relevant to the request. Generally, this comprises all entries for an extent that overlap with an address range identified in the storage node request. Those entries are then read (e.g., to service a read request), updated (e.g., to service a write request), or deleted (e.g., to service a write or delete request) to service the access request at 308. In some embodiments, one or more new entries are created to store additional information about the extent (e.g., tombstone entries, regular entries, or a combination thereof).

At 310, the corresponding storage device is read from or written to as indicated by the access request. For, example, a read can require accessing one or more blocks on a storage device to retrieve data or to write data. In some embodiments, the ordering of operations is dependent on the operation being performed. For example, when storage node request that requires that data be written to a storage device, that data is first written before changing or creating a corresponding entry in metadata. Such techniques serve to avoid data corruption in the event that the request fails during processing.

Finally, at 312 a response is constructed to the storage node request. For instance, a buffer can be populated with the retrieved data segments properly ordered therein. The response can further comprise constructing a response header and providing a specification therein of one or more segments that correspond to a tombstone (e.g., pattern fill, static fill, etc.). Any of the approaches disclosed herein can be used to generate data corresponding to a tombstone—e.g., but applying application or file specific content generation logic. Such an approach can be used to avoid transmitting data that can otherwise be easily generatable using the data client that sent the storage node request.

Figure 4A:
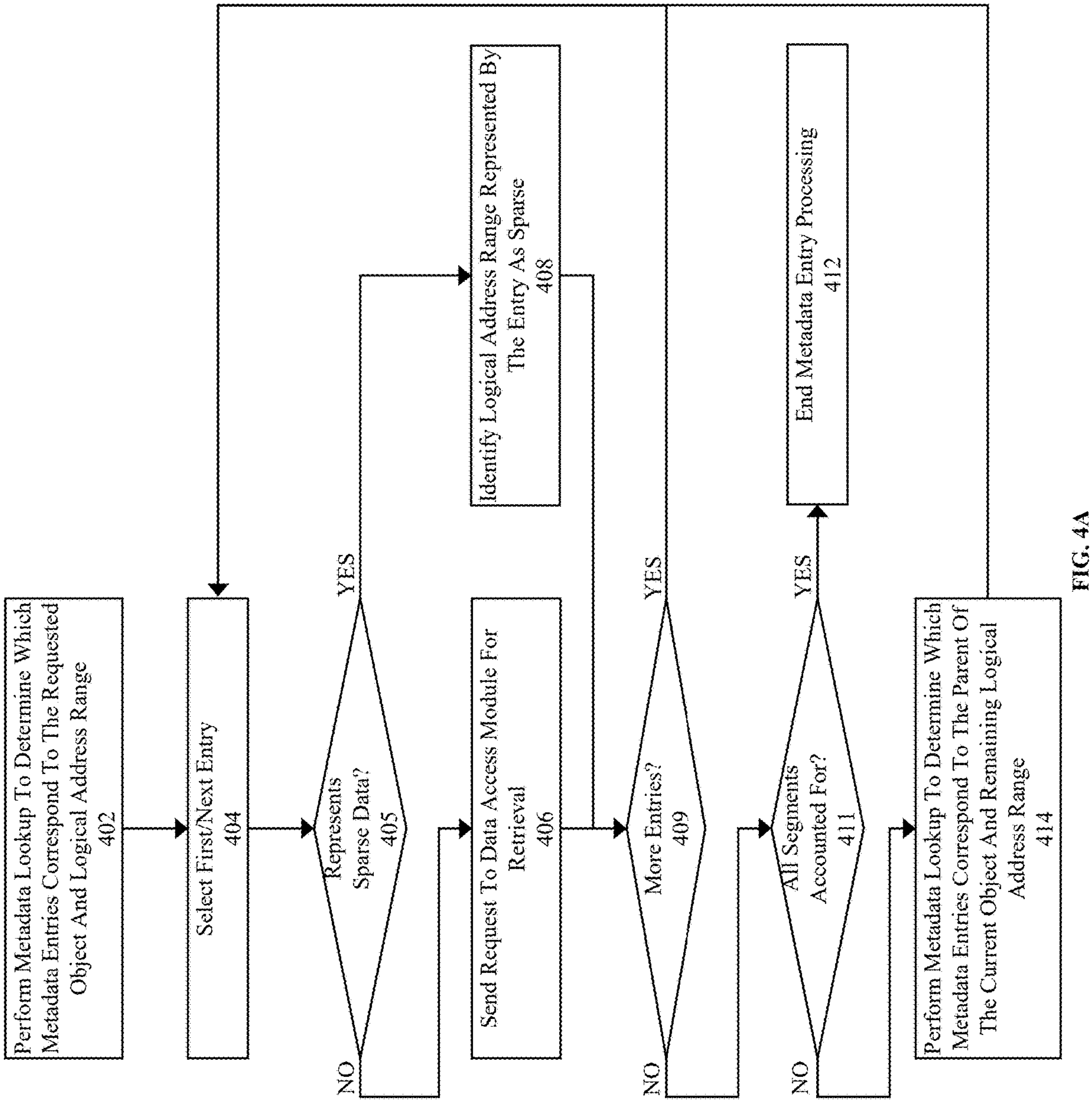

FIGS. 4A-4C3 illustrate approaches to entry processing to service storage node requests according to some embodiments.

FIG. 4A illustrates a flow for processing a storage node request specifying a read operation at a storage node according to some embodiments. Generally, the approach processes the entries in a hierarchical manner where entries for the requested object (which may be a clone or a snapshot) are processed first, followed by processing of entries for an immediate parent and then the parent's parent and so on until all segments needed to service the storage node request are collected.

In some embodiments, the process starts at 402 where a metadata lookup is performed to determine which metadata entries correspond to a requested object and logical address range for the request. For example, a snapshot ID (e.g., for a snapshot or clone that represents the requested object) and a logical address range can be used to perform a lookup to identify all entries that are relevant to the request—e.g., include the snapshot ID and overlap with the logical address range. Those entries are subsequently selected one-by-one for processing at 404.

Specifically, at 404 a first or next entry in selected for processing. To process the selected entry, the flow first determines whether the entry corresponds to sparse data at 405. For example, the entry can be identified as sparse based on a value in a type field (e.g., as sparsity identifier or tombstone entry type) or based on a lack of a valid physical address (e.g., 0). If the entry is of a type that is sparse (e.g., a tombstone), then the process proceeds to 408 where the logical address range specified by the entry is identified as sparse. On the other hand, if the entry is not sparse, a request is forwarded to a data access module (e.g., to a device controller) to retrieve the identified data at the corresponding physical address contained in the entry at 406. After which, if there are more entries to be processed (see e.g., the determination at 409) the process returns to 404 to select the next entry for processing. If on the other hand, it is determined (see e.g., the determination at 409) that all the corresponding entries for the object have been processed the flow proceeds to 411.

At 411 a determination is made as to whether all segments have been accounted for. Specifically, the approach can determine whether the entries that have been processed thus far describe the contents of the entire logical address range for the request. Any number of approaches could be taken to enable such a determination. For instance, a vector-based approach could be utilized. For example, a request vector and processing vector of the same size could be generated for each request. The request vector and the processing vector each include a number of bits that is equal to the largest number of segments that could be used to represent that object. For instance, if the object is an extent of 1 MB and the smallest size corresponding to each entry is 8 KB then the vectors would each be 128 bits long. Each bit that corresponds to a segment that is encompassed by the request is set (e.g., to 1) in the request vector to indicated that it is requested and the remainder are clear (e.g., set to 0). Similarly, after initially clearing all the bits of the processing vector, each entry is processed and the corresponding bits are set. Upon reaching 411, the request vector and the processing vector are compared to determine whether all segments have been accounted for. If all segments have been accounted for, the process proceeds to 412 where metadata entry processing ends. However, if the request vector is not equal to the processing vector, a metadata lookup is performed to determine which metadata entries corresponding to a current object and logical address range for the request at 414. This is essentially the same as with 402 but is only for the remaining logical address range. Additionally, this process will continue until all segments have been accounted for as determined at 411.

Figure 4B:
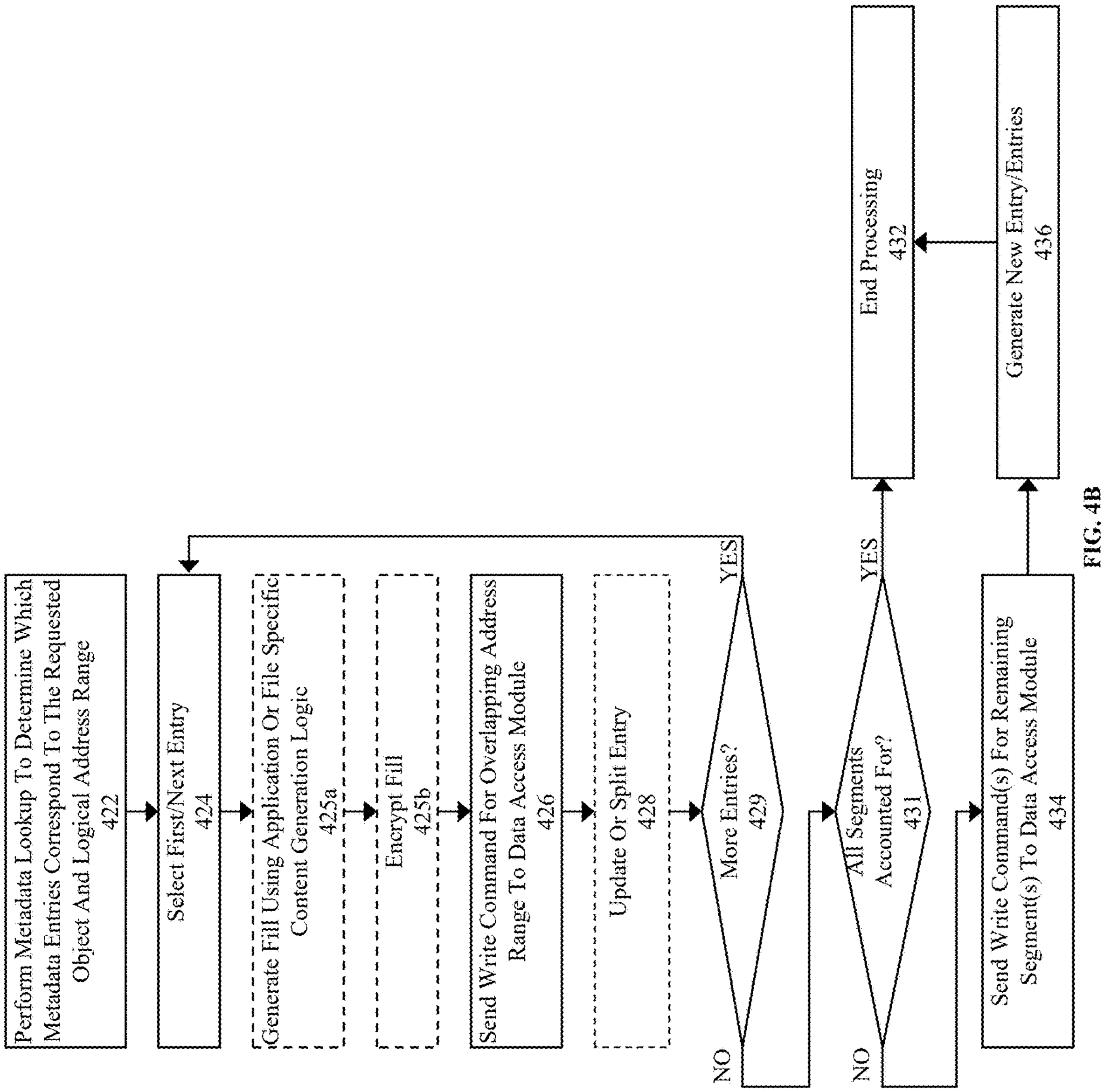

FIG. 4B illustrates a flow for processing a storage node request specifying a write operation at a storage node according to some embodiments. Generally, the approach is implemented in what can be thought of as two phases. In a first phase, data is written for overlapping address ranges for any existing entries. In a second phase, any remaining segments are written to disk and corresponding entries are generated for future reference to those segments.

In some embodiments, the process starts at 422 where a metadata lookup is performed to determine which metadata entries correspond to a requested object and logical address range for the request. For example, a snapshot ID (e.g., for a snapshot or clone that represents the requested object) and a logical address range can be used to perform a lookup to identify all entries that are relevant to the request—e.g., include the snapshot ID and overlap with the logical address range. Those entries are subsequently selected one-by-one for processing at 424.

Specifically, at 424 a first or next entry is selected for processes. Generally, to process the selected entry, a write command is sent to the data access module to update the corresponding physical address range identified in the entry at 426. In some embodiments, prior to execution of a corresponding write operation, fill is generated using the application or file specific content generation logic (see e.g., 425*a*). For example, if a currently selected entry comprises a tombstone, it is possible that at least some fill will need to be written. To illustrate, if a valid entry size cannot be appropriately selected that would encompass only the to be written data, then the entry would include both the to be written data and dynamically generated fill. For instance, if the minimum size for an entry corresponds to 8 KB, the tombstone entry corresponds to 8 KB, and the requested write overlaps with only 4 KB, then 4 KB of fill would be generated and written before updating the tombstone entry to a regular entry. On the other hand, if the tombstone can be split (e.g., valid sizes include at least 8 KB and 16 KB, the tombstone is 16 KB and the data to be written is 8 KB at either the beginning or the end of the corresponding address range) the entry would be updated to reflect a smaller size (e.g., 8 KB) and address range and a new entry would be added to reflect the newly written data (e.g., a regular entry of 8 KB). Thus, in the event that fill will need to be written, the process first generates fill using application or file specific content generation logic at 425*a* and as discussed herein, and when indicated would encrypt the fill before proceeding to 426 where both the data and fill (either encrypted or not encrypted) is written to disk.

In some embodiments, tombstone entries require special handling. For instance, at 428 the tombstone entry is updated or split. As provided herein, an update converts the tombstone entry into a regular entry and adds a corresponding physical address where the data is stored. However, if the tombstone and the address range to be written do not fully overlap, in some embodiments, the tombstone entry is updated to include only the remainder that is to remain a tombstone and an additional entry is added to represent the data that was written. After which, if there are more entries to be processed (see e.g., the determination at 429) the process returns to 404 to select the next entry for processing. If on the other hand, it is determined (see e.g., the determination at 429) that all the corresponding entries for the object have been processed the flow proceeds to 431.

At 431 a determination is made as to whether all segments have been accounted for. Specifically, the approach can determine whether the entries that have been processed thus far describe the contents of the entire logical address range for the request. Any number of approaches could be taken to enable such a determination. For instance, a vector-based approach could be utilized. For example, a request vector and processing vector of the same size could be generated for each request. The request vector and the processing vector each include a number of bits that is equal to the largest number of segments that could be used to represent that object. For instance, if the object is an extent of 1 MB and the smallest size corresponding to each entry is 8 KB then the vectors would each be 128 bits long. Each bit that corresponds to a segment that is encompassed by the request is set (e.g., to 1) to indicated that it is requested and the remainder are clear (e.g., set to 0). Similarly, after initially clearing all the bits of the processing vector, each entry is processed and the corresponding bits are set. Upon reaching 431, the request vector and the processing vector are compared to determine whether all segments have been accounted for. If all segments have been accounted for, the process proceeds to 432 where processing ends. However, if the request vector is not equal to the processing vector, one or more write commands are sent for the remaining segment (s) to the data access module at 434 and one or more new entries are generated at 436 before ending the process at 432, which may include fill generation and encryption as discussed elsewhere herein.

FIGS. 4C1-4C3 illustrate a flow for processing a storage node request specifying a delete operation at a storage node according to some embodiments. Generally, the approach includes one or more of deleting entries, updating entries, creating entries, and splitting entries.

In some embodiments, the process starts at 442 where a metadata lookup is performed to determine which metadata entries correspond to a requested object and logical address range for the request. For example, a snapshot ID (e.g., for a clone that represents the requested object) and a logical address range can be used to perform a lookup to identify all entries that are relevant to the request—e.g., include the snapshot ID and overlap with the logical address range.

At 443, it is determined whether the storage node request is to delete the entire object. If the request is to delete the entire object the process proceeds to 444 where all metadata entries are removed for the object. If on the other hand the request is to delete only a part of the object the process proceeds to 446.

Specifically, at 446 a first or next entry is selected for processing. To process the request a series of comparisons may be performed. For example, if the logical address range of the entry fully overlaps with the logical address range to be deleted (see 447) the process proceeds to 448 where the entry is converted to, or left as, a tombstone entry. However, if the logical address range of the entry does not fully overlap with the logical address range to be deleted (see 447), the process proceeds to 449 where it is determined whether the entry is a tombstone. If the logical address range of the entry does not fully overlap with the logical address range to be deleted (see 447) and the entry is not a tombstone (see 449), the process proceeds to 451 where it is determined whether the entry can be split. As provided herein, splitting an entry is possible when a tombstone can be formed for a first portion and a regular entry can be formed for a second portion. Generally, splitting is possible when a both the portion to be deleted can be represented by a tombstone with a valid size and a remainder can be formed with a valid size. In some embodiments, multiple remainders may be formed. For instance, an entry that represents four segments can be split into three entries, a first that represents a single segment and is a tombstone, a second that represents another single segment and is a first remainder, and a third that represents two segments and is a second remainder.

If it is determined that the entry cannot be split, the process proceeds to 452 where a deletion command is sent to the corresponding data access module for the overlapping address range. Such a command can specify writing a corresponding portion of fill to the underlying physical storage device. In some embodiments, and as provided herein, ill can be generated at provided in 425*a* using application or file specific content generation logic. similarly, where indicated, the generated fill is encrypted at 425*b*—e.g., using a file specific encryption key. On the other hand, if the entry can be split (see 451) then the process proceeds to 454 where the entry is updated to reflect the remainder and to 456 where a tombstone entry is created for the deleted address range. Additionally, in some embodiments, after an entry is updated to reflect a remainder (see 454) the process may also process to 452 to specify writing a corresponding portion of fill to the underlying physical storage device. After which, if there are more entries to be processed (see e.g., the determination at 457) the process returns to 446 to select the next entry for processing. If on the other hand, it is determined (e.g., at 457) that all the corresponding entries for the object have been processed the flow proceeds to 459.

At 459 a determination is made as to whether all segments have been accounted for. Specifically, the approach can determine whether the entries that have been processed thus far describe all the deleted contents of the entire logical address range for the request. Any number of approaches could be taken to enable such a determination. For instance, a vector-based approach could be utilized. For example, a request vector and processing vector of the same size could be generated for each request. The request vector and the processing vector each include a number of bits that is equal to the largest number of segments that could be used to represent that object. For instance, if the object is an extent of 1 MB and the smallest size corresponding to each entry is 8 KB then the vectors would each be 128 bits long. Each bit in the request vector that corresponds to a segment that is encompassed by the request is set (e.g., to 1) to indicated that it is requested and the remainder are clear (e.g., set to 0). Similarly, after initially clearing all the bits of the processing vector, each entry is processed and the corresponding bits are set. Upon reaching 459, the request vector and the processing vector are compared to determine whether all segments have been accounted for. If all segments have been accounted for, the process proceeds to 460 where processing ends. However, if the request vector is not equal to the processing vector, one or more new tombstone entries are generated at 462 before ending the process at 460.

Figure 5:
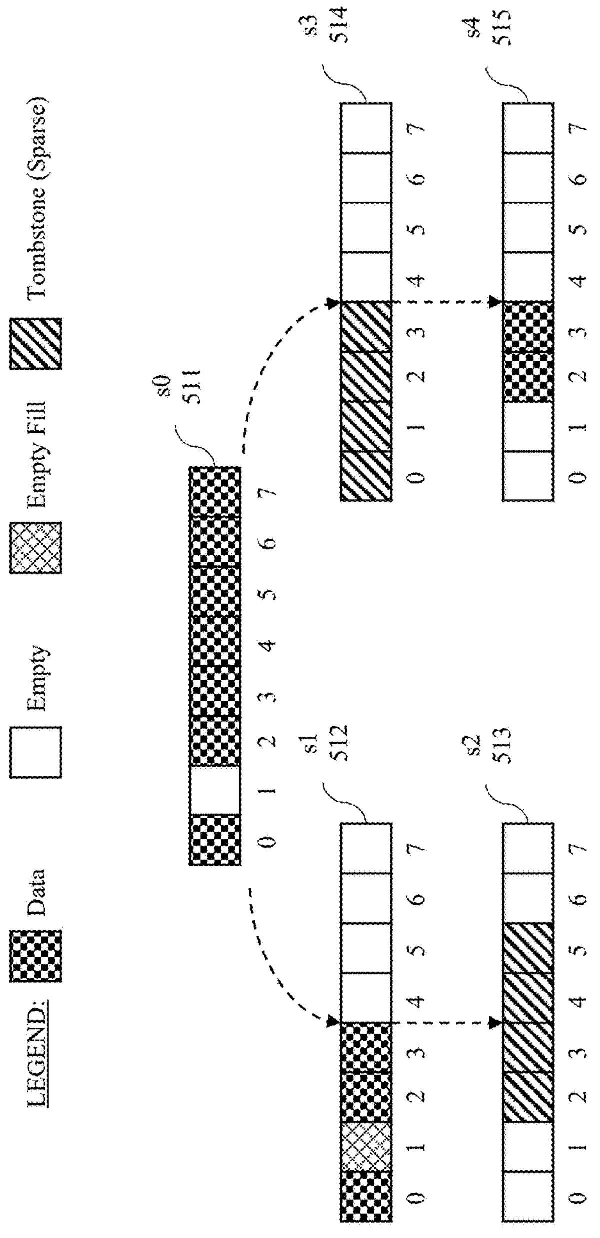
FIG. 5 provides an illustrative example of a set of entries for an object and a visual representation thereof according to some embodiments.

FIG. 5 provides an illustrative example of a set of entries for an object and a visual representation thereof according to some embodiments.

An entry table having a plurality of rows and columns is illustrated at 510. The columns are organized left to right as snapshot ID, allocation type, allocation size, logical offset, and physical address. Each row represents an entry that uses a snapshot ID as a key. As provided herein snapshots and clones are all identified using a snapshot ID. The difference between a snapshot and a clone being that the clone does not currently having any child snapshots or clones and is writable. Whereas a snapshot is read-only. However, by identifying snapshots and clones by a snapshot ID, the computing system can consistently and efficiently identify a corresponding requested object. Each entry also includes an allocation type specification (e.g., regular or tombstone). A regular allocation type is just that, an entry that represents an allocation of storage where data has been stored for the corresponding object. A tombstone on the other hand does not require a corresponding allocation of storage as it instead identifies a segment that is sparse or to be populated with a known static or fill value- or application or file specific content generation logic. An allocation size specifies the number of segments that the entry represents. Allocation sizes may conform to a set of valid sizes. For example, a smallest allocation size may comprise 1 segment, with each subsequent allocation size being twice as large as the prior allocation size (e.g., 1, 2, 4, 8, 16, etc.) up to an allocation size that is equal to the size of the object (extent) to which they correspond. In some embodiments a segment size comprises a block size for an underlying storage device upon which corresponding data would be stored. A logical offset is a number of segments from the start of the object (e.g., extent) to which the information corresponds. Finally, where appropriate, a physical address is provided that specifies a starting location where corresponding data can be found (see e.g., PA-s01, PA-s02, PA-s03, PA-s11, PA-s41). In some embodiments, tombstone entries are not associated with a corresponding physical address. In some embodiments, a tombstone entry may include a physical address but that address is ignored.

The visual representation of the extent at the time that snapshot s0 was taken is represented at 511. As can be seen from the representation, all segments (0-7) are associated with stored data with the exception of segment 1. The first segment corresponds to the entry table row with the snapshot ID of s0, the logical offset of 0, and an allocation size of 1. The second and thirds segments corresponds to the entry table row with the snapshot ID of s0, the logical offset of 2, and an allocation size of 1. The fourth through seventh segments corresponds to the entry table row with the snapshot ID of s0, the logical offset of 4, and an allocation size of 4.

The visual representation of the extent at the time that snapshot s1 was taken is represented at 512. In the present example, snapshot s1 is a child of snapshot s0. As can be seen from the representation segments (0-3) are associated with stored data. However, segment 1 is actually populated with empty fill (e.g., a pattern or static value as discussed herein). This is because S1 corresponds to a single entry in the entry table (see 510) having an allocation size of 4 and an offset of zero. As a result, prior to creation of that entry, empty fill was written into the segment 1 while the remainder of the data was written into segments 0, 2, and 3. For example, the empty fill can be generated based on application or file specific content generation logic and further encrypted using an encryption key retrieved from the encryption key store as discussed herein.

The visual representation of the extent at the time that snapshot s2 was taken is represented at 513. In the present example, snapshot s2 is a child of snapshot s1. As can be seen from the representation segments (2-5) are associated with stored data. This corresponds to the single entry in the entry table (see 510) having an allocation size of 4 and an offset of 2.

The visual representation of the extent at the time that snapshot s3 was taken is represented at 514. In the present example, snapshot s3 is a child of snapshot s0. As can be seen from the representation segments (0-3) are associated with a tombstone. This corresponds to the single entry in the entry table (see 510) having an allocation size of 4 and an offset of 0. Such an entry essentially indicates to the storage node that s3 is essentially s0 with segments 0-3 removed.

The visual representation of the extent at the time that snapshot s4 was taken is represented at 515. In the present example, snapshot s4 is a child of snapshot s2. As can be seen from the representation segments (2-3) are associated with stored data. This corresponds to the single entry in the entry table (see 510) having an allocation size of 4 and an offset of 2. Such an entry essentially indicates to the storage node that s4 is essentially s3 with segments 2-3 added.

FIGS. 6A-6D provide an illustrative example of a how the set of entries, and a visual representation thereof, for an object illustrated in FIG. 5 according to some embodiments. The description of like identified elements discussed in regard to FIG. 5 are applicable to the present embodiment discussed in FIG. 6A-6D.

Figure 6A:
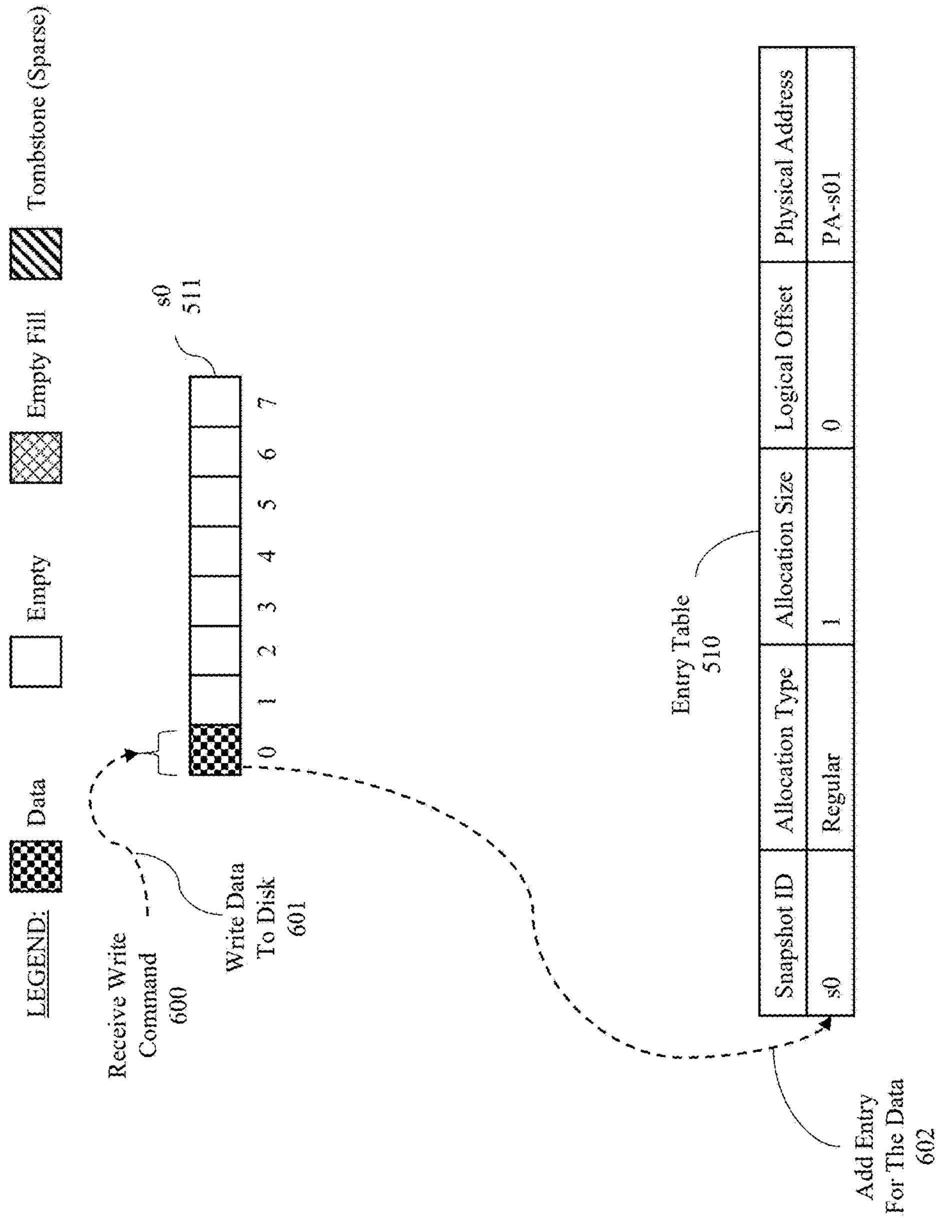
FIGS. 6A-6D provide an illustrative example of how a set of entries are generated, and a visual representation thereof, for an object illustrated in FIG. 5 according to some embodiments.

FIG. 6A illustrates the creation of a first entry at 602 for s0 (see 511). Such an entry is illustrated as being created in response to a write command received at 600 and is created after the corresponding data is written to disk (see 601). In some embodiments, upon initialization a corresponding extent would be created to specify that the object (e.g., extent) is sparse.

Figure 6B:
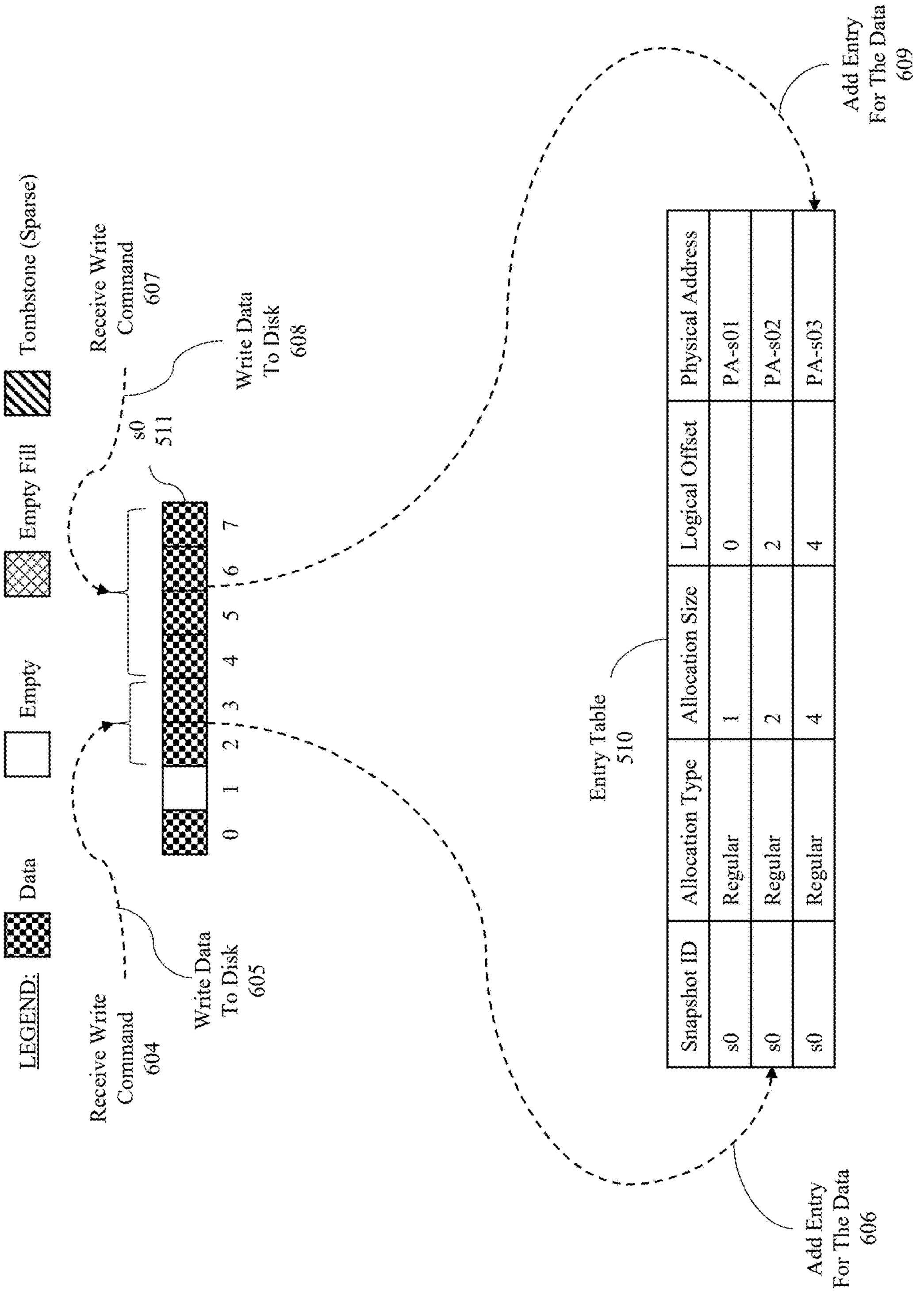

FIG. 6B illustrates the creation of a second and third entry at 606 and 609 respectively for s0. Such entries are illustrated as being created in response to a corresponding write command received at 604 and 605 respectively. Such entries would be created after the corresponding data is written to disk at 605 and 608 respectively.

Figure 6C:
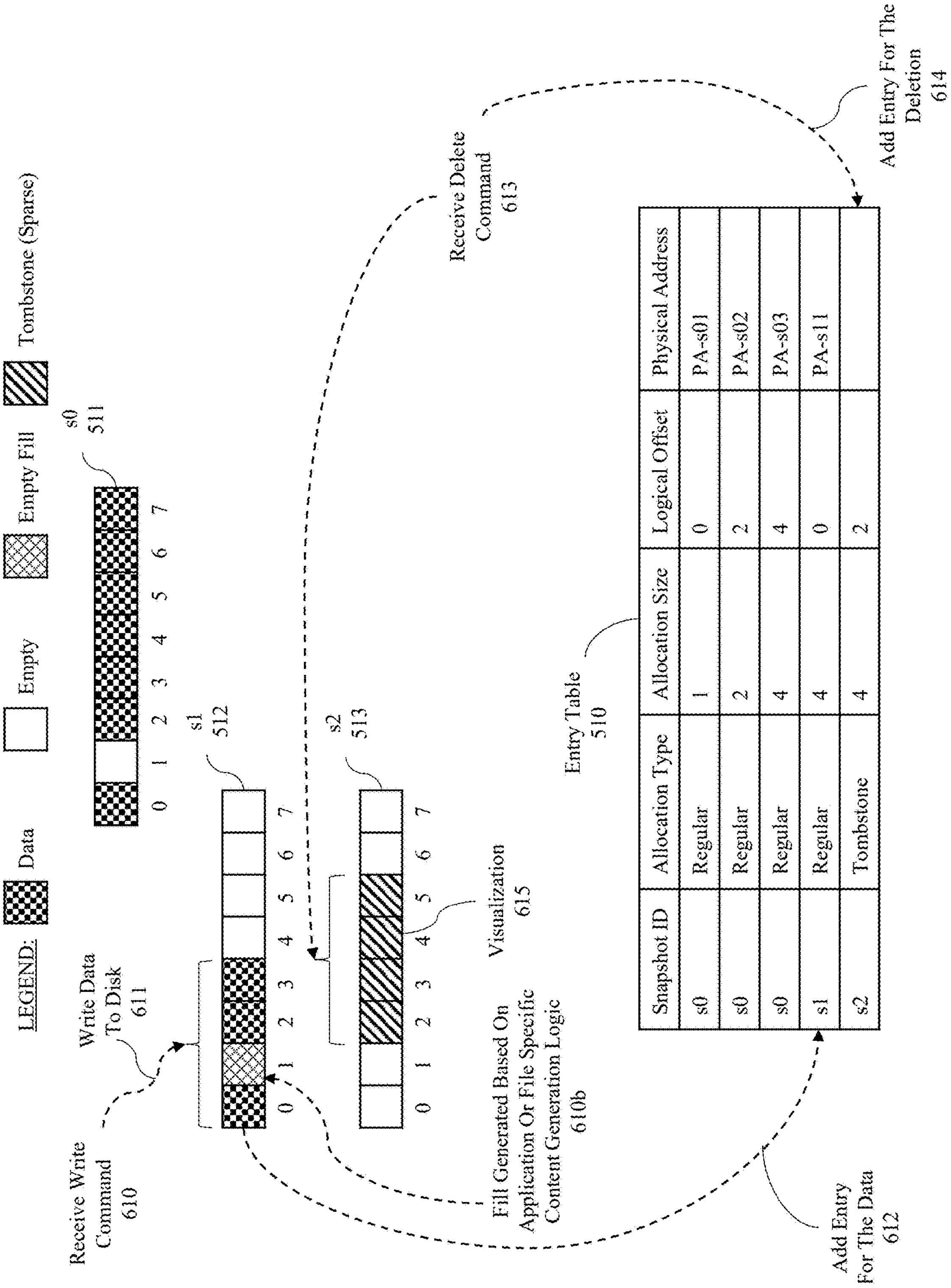

FIG. 6C illustrates the creation of an entry at 612 for a first child s2 of snapshot s0. Such an entry is illustrated as being created in response to a write command received at 610 and is created after the corresponding data is written to disk (see 611). As provided herein, the fill portion in segment 1 is generated abased on application or file specific content generation logic (see 610*b*). Additionally, if the data in the file is encrypted the fill, after generation and before storage, will be encrypted using the same key (e.g., file encryption key). At a later date, (e.g., after a clone of s1 is created) an entry at 614 for a child s2 of snapshot s1 is created. Such an entry is illustrated as being created in response to a delete command received at 613 (see visualization 615).

Figure 6D:
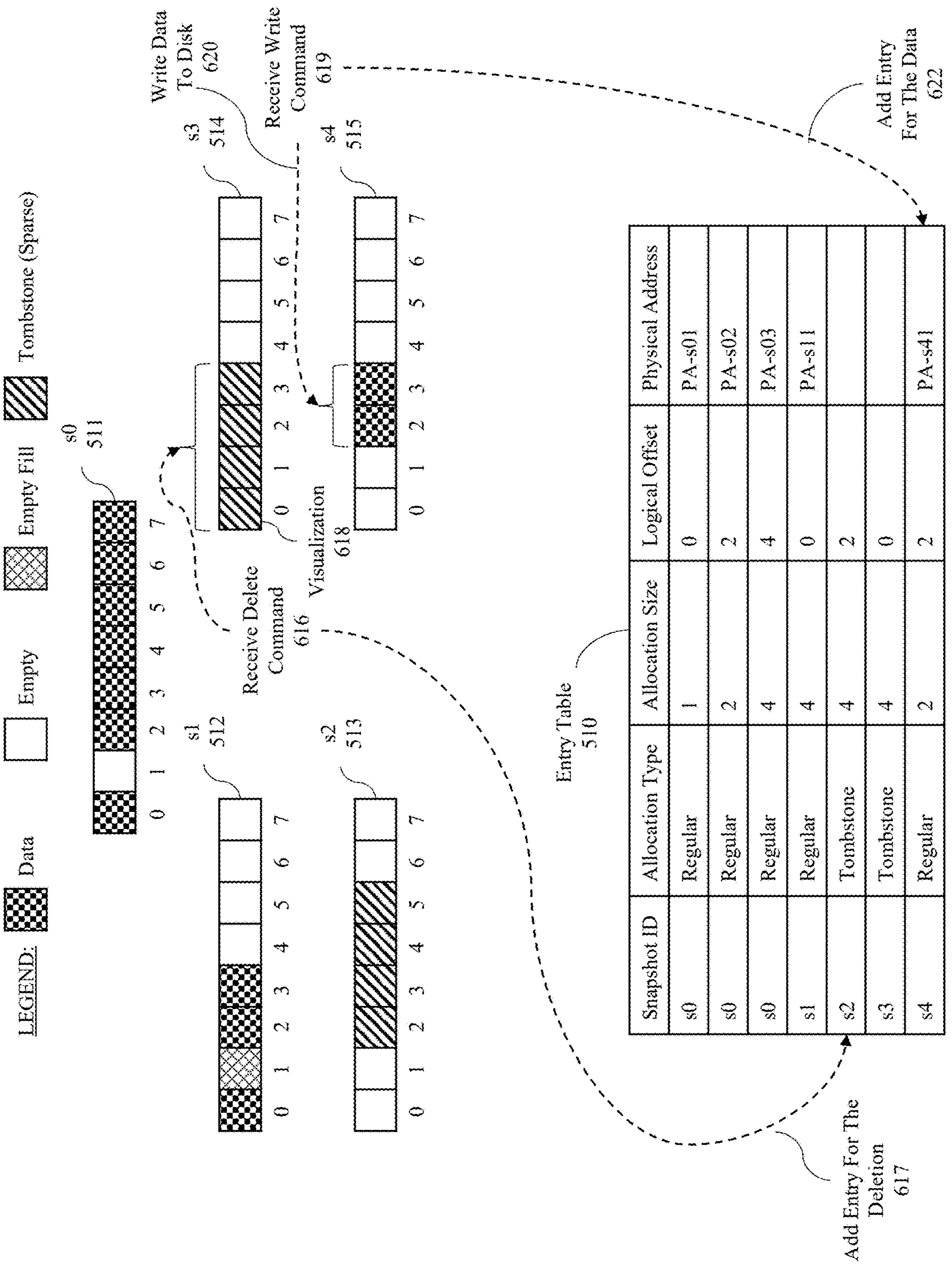

FIG. 6D illustrates the creation of an entry at 617 for a second child s3 of snapshot s0. Such an entry is illustrated as being created in response to a delete command received at 616 (see visualization 618). At a later date, (e.g., after a clone of s3 is created) an entry at 622 for a child s4 of snapshot s3 is created. Such an entry is illustrated as being created in response to a write command received at 619 and is created after the corresponding data is written to disk (see 620).

Figure 7A:
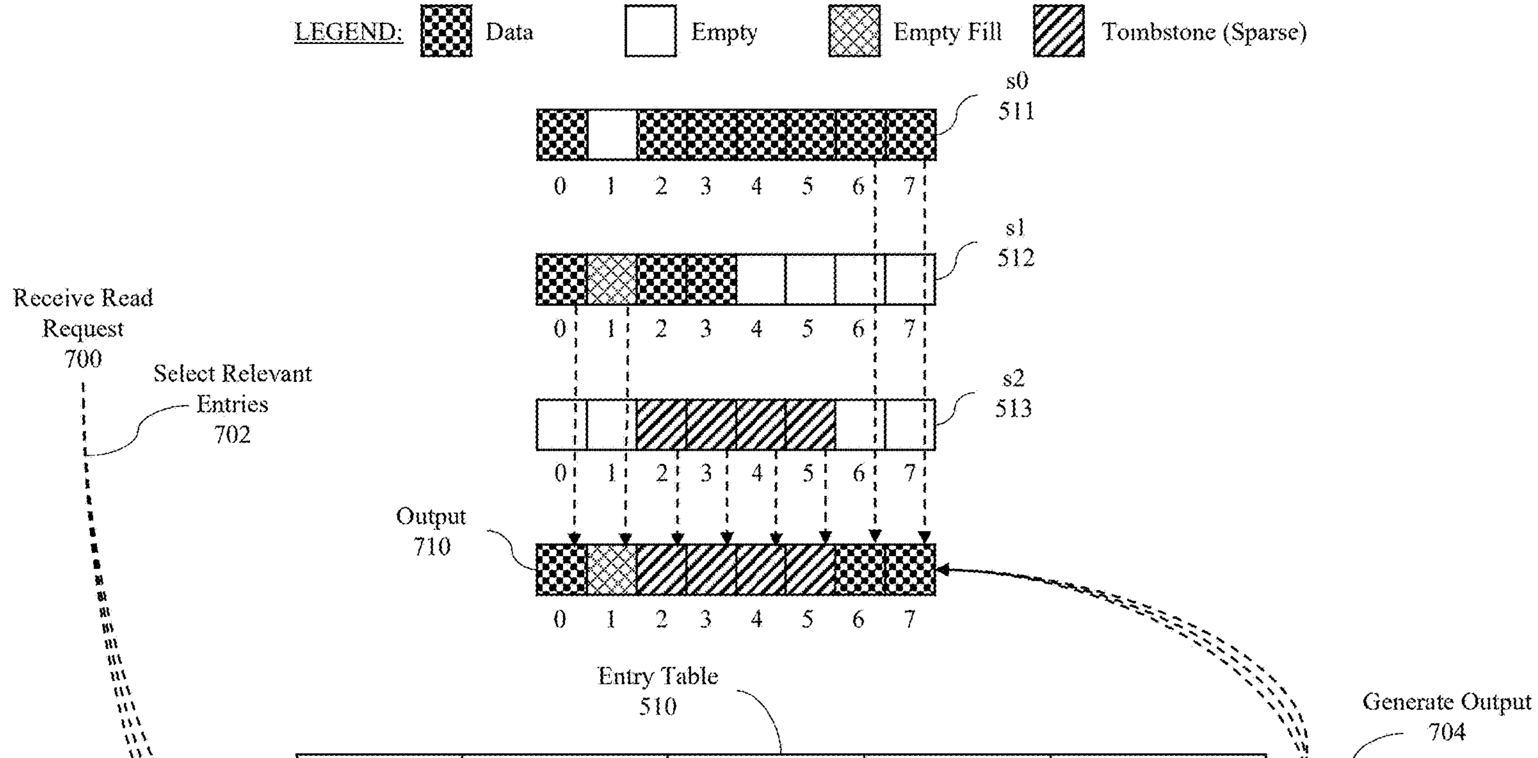
FIGS. 7A-7B provide an illustrative example of selection of segments in response to read requests, and a visual representation thereof, for an object illustrated in FIG. 5 according to some embodiments.
Figure 7B:
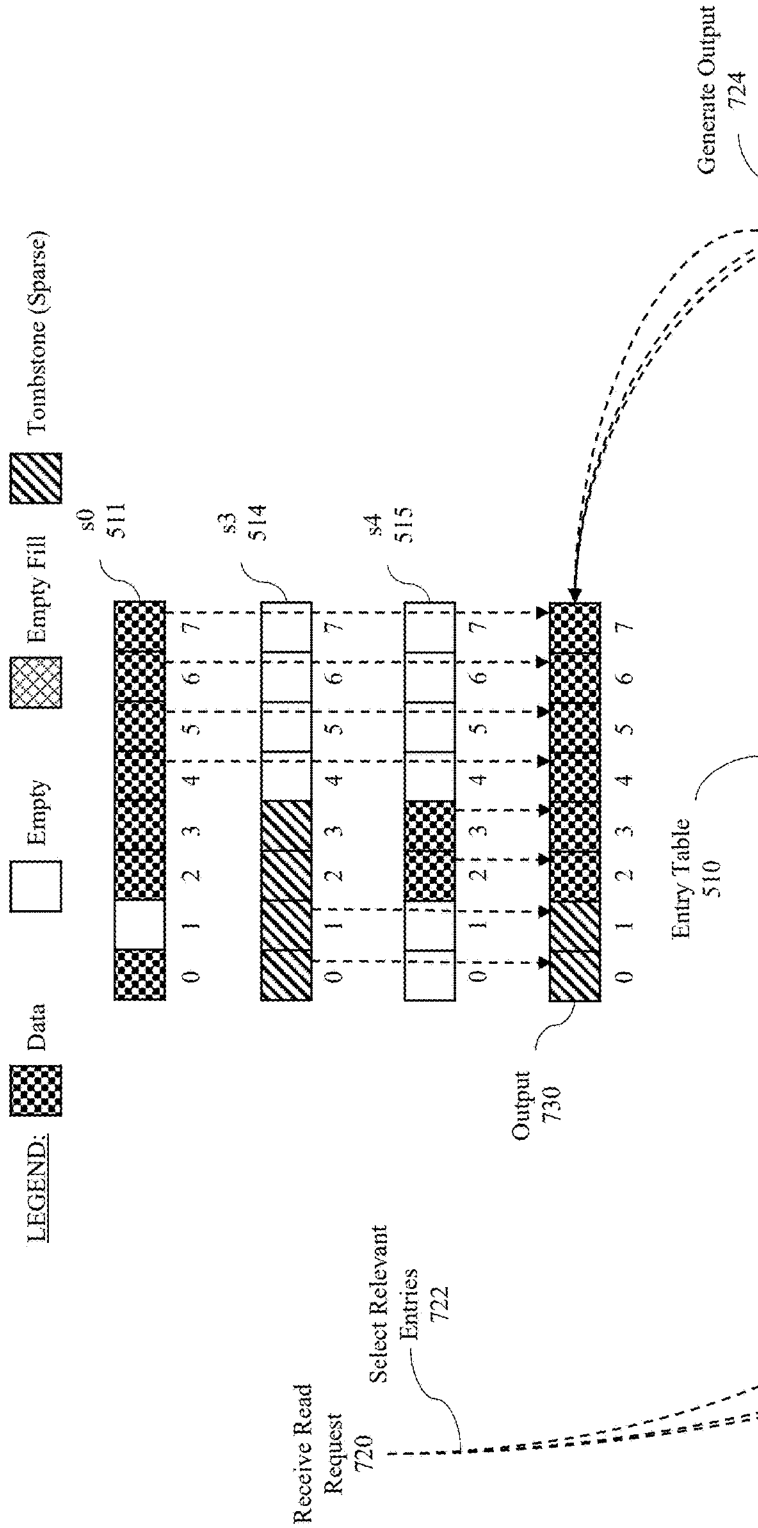

FIGS. 7A-7B provide an illustrative example of selection of segments in response to read requests, and a visual representation thereof, for an object illustrated in FIG. 5 according to some embodiments. The description of like identified elements discussed in regard to FIG. 5 are applicable to the present embodiment discussed in FIG. 7A-7B.

FIG. 7A illustrates the receipt and selection of corresponding segments in response to a read request 700. For example, the request can comprise a request to read all of the s2 object. Such a request would select relevant entries (see 702) and generate an output (see 710). For example, the process can first select the segments from s2 and place them in a buffer or corresponding representation (see e.g., selection of segments 2-5 from s2 into the output buffer 710). Subsequently, the immediate parent (see s1) is processed to select corresponding segments (see e.g., selection of segments 1-2 from s1 into the output buffer 710). Finally, the next parent (s0) is processed to select corresponding segments (see e.g., selection of segments 6-7 from s0 into the output buffer 710). As illustrated here, entries in the child override entries in the parent. Thus, a tombstone in the child overrides the data in the parent. As provided herein, data for the segments corresponding to the tombstone(s) are dynamically generated using application or file specific content generation logic (e.g., upon receipt at the compute node).

FIG. 7B illustrates the receipt and selection of corresponding segments in response to a read request 720. For example, the request can comprise a request to read all of the s4 object. Such a request would select relevant entries (see 722) and generate an output (see 730). For example, the process can first select the segments from s4 and place them in a buffer or corresponding representation (see e.g., selection of segments 2-3 from s4 into the output buffer 730). Subsequently, the immediate parent (see s3) is processed to select corresponding segments (see e.g., selection of segments 1-2 from s3 into the output buffer 730). Finally, the next parent (s0) is processed to select corresponding segments (see e.g., selection of segments 4-7 from s0 into the output buffer 730). Thus, a tombstone in the child overrides the data in the parent, but data in the child's child overrides the tombstone in the child's child. As provided herein, data for the segments corresponding to the tombstone(s) are dynamically generated using application or file specific content generation logic (e.g., upon receipt at the compute node).

Figure 8:
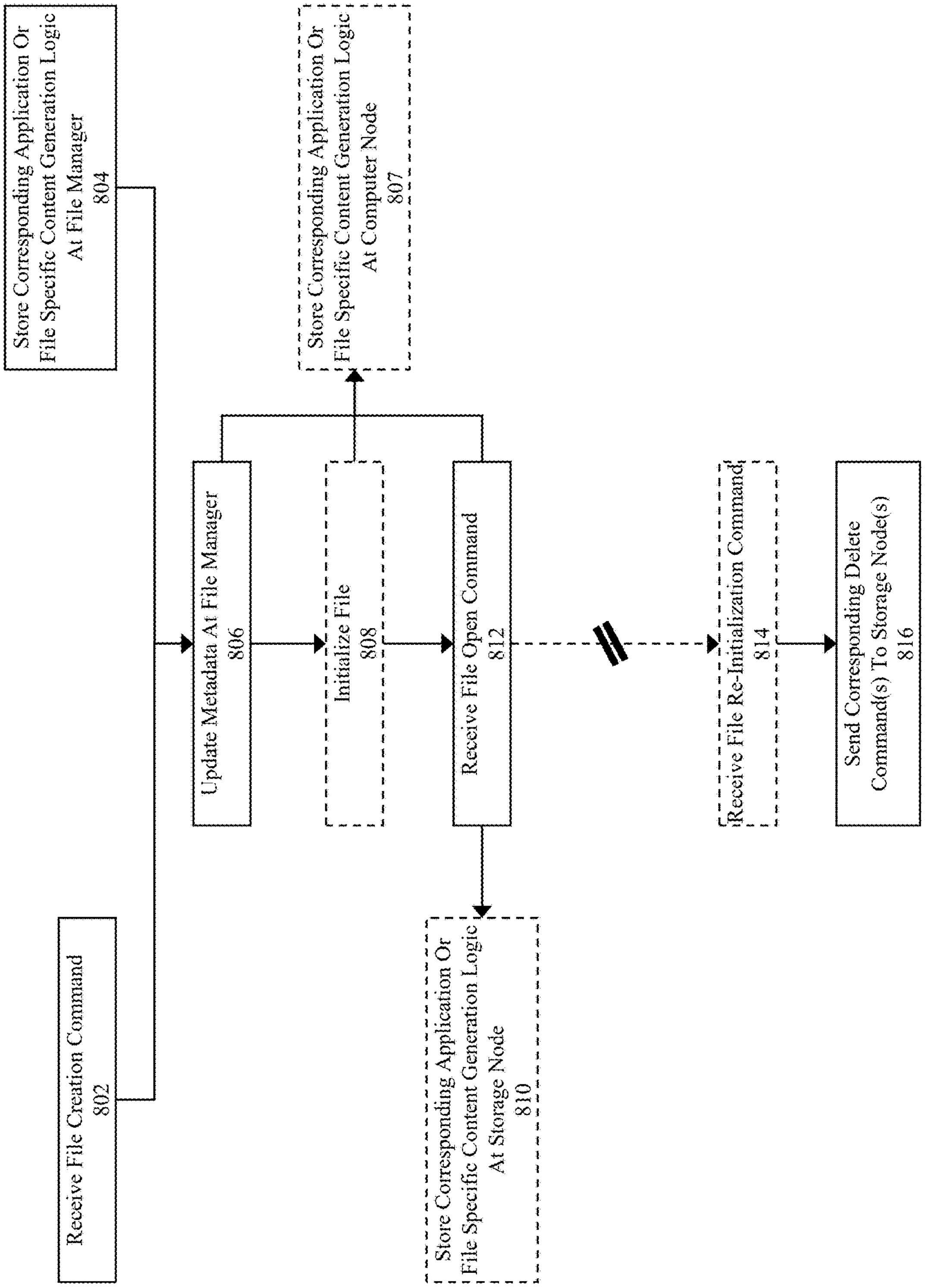
FIG. 8 illustrates a flow for a file lifecycle according to some embodiments.

FIG. 8 illustrates a flow for a file lifecycle according to some embodiments. Generally, the flow encompasses file creation, initialization, opening, and re-initialization at a later date. Not illustrate are any number of read and write operations that could be executed against the file.

As discussed herein, the file manager stores information to enable file access such as file metadata (see e.g., 132) and encryption keys (see e.g., 134). Additionally, at 804 the file manager stores application or file specific content generation logic (see e.g., 136). This information could be provided around the time of file creation (e.g., just before or just after) or could be provided in advance—e.g., as part of an application installation process or as part of a file type specification. For example, upon installation of an application associated with a specified file type (e.g., doc or docx associated with Microsoft word) corresponding application or file specific content generation logic is stored at the file manager. In some embodiments, the file comprises an image (e.g., ISO, VDI, VMDK, BHD, or HDD images) or database file (e.g., dbf, dbs, sql, or jdbc).

At 802, a file creation command is received. For instance, the file creation command can be received in response to an action by a user on a user device that interacts with a user process (see e.g., 112*a*) on a compute node (see e.g., 110*a*) to cause the creation of a file. Upon file creation the metadata at the file manager is updated to reflect the existence of the file which may include a file identifier (file ID), a database ID (DB_ID), a file type or some combination thereof. Additionally, the metadata update may include the registration or generation of a file encryption key that is stored at the file manager (see e.g., encryption key store 134 on file manager 130). Generally, file creation causes corresponding file information to be stored at the file manager. Such information specifies the existence of a file but that file does not yet have any contents.

At 808, a file is initialized. Generally, initialization is the creation of a file having the necessary structural information but not having any contents. Specifically, this can comprise a header that specifies information about the file that conforms to the type of the file, a body that is filled or initialized to an initial state (e.g., empty) and a footer that can specify an end of file and a checksum. In prior approach all the header, body and footer would all be materialized in storage which requires that storage be allocated and written to with the indicated information. In contrast, the present approach does not necessarily require that any information be written to the storage devices (beyond potentially a tombstone entry). This is because the approach provided herein can generate one or more segments of the file dynamically using application or file specific content generation logic. Thus, file initialization can comprise creation of only a tombstone entry without actually storing file contents at the storage node, or can comprise creation of one or more tombstone entries and one or more regular entries to store only a subset of the corresponding information. For example, a file initialization for a file having an initial size of 1 MB can be associated with storage of only an 8 KB block including header information with the remainder represented by a tombstone entry. Generally, file initialization commands are sent from a compute node to the file manager and the file manager sends one or more corresponding commands to one or more corresponding storage nodes.

At some time after a corresponding file has been initialized (see 808) the file may be opened at a compute node (see 812). As provided herein, the compute node may be the same compute node associated with the creation of the file or may be a different compute node—e.g., the file can be created using a first session on a first compute node at a first time, and opened using a second session on a second compute node at a second time after the first time. Because the file may be sparse, the storage node (see e.g., 120*a*), will take actions to ensure that it has a stored copy of relevant application or file specific content generation logic at 810. For example, the storage node may send a request to the file manager to retrieve the relevant information, potentially after performing a lookup to determine whether the storage node already includes a copy of the corresponding information.

At 807, the compute node (see e.g., 110*a*), will take actions to ensure that it has a stored copy of relevant application or file specific content generation logic at 807. For example, the compute node may send a request to the file manager to retrieve the relevant information, potentially after performing a lookup to determine whether the compute node already includes a copy of the corresponding information. Such an action can happen at any appropriate time. For instance, at the time of file creation, upon file initialization, or upon receipt of a file open command.

After a file is opened, a user (through a user session on a corresponding compute node) can operate on the file. Such operations may include reading, writing, updating, and deleting the file or portions thereof. During this time, any number of snapshots may be taken and metadata entries and corresponding read and write operations may occur on a corresponding storage device as discussed herein. After a period of time, a re-initialization command can be issued to bring some or all of the file back to an initialized state. In some embodiments, the re-initialization is sent to the file manager from a compute node (see 814) and the file manager sends corresponding delete or initialization commands to the storage nodes (see 816). Such commands may operate to delete the indicated portions and replace them with one or more tombstones as warranted.

Figure 9:
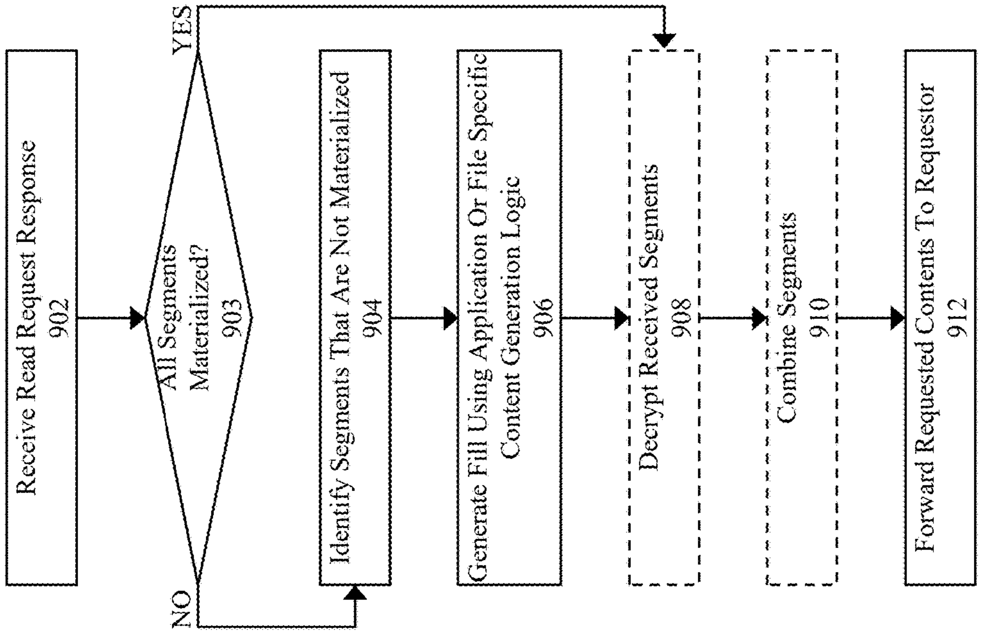
FIG. 9 illustrates a flow for processing a response to a read request according to some embodiments.

FIG. 9 illustrates a flow for processing a response to a read request according to some embodiments. Generally, the approach comprises receiving one or more segments of an underlying file and when indicated materializing segments that were identified as sparse.

At 902, a read request response is received. For example, a read request response is received from one or more storage nodes and at a compute node that previously sent a read request to those compute nodes. As provided herein the request may include one or more segments of data that were requested, may include an identification of one or more requested segments as sparse, or some combination thereof.

If there are sparse segments (e.g., not all segments are materialized), as determined at 903, the process proceeds to 904 where the segments that are not materialized are identified and subsequently to 906 where fill is generated for the identified segments using application or file specific content generation logic. However, if all segments are materialized, or after generation of the non-materialized segments, the process proceeds to 908 where any segments that where received may be decrypted if needed (e.g., using a file specific encryption key). After which all the segments may be combined at 910, and then forwarded to the content requestor at 912.

FIGS. 10A-10G provide an illustrative of file operations according to some embodiments. The operations illustrated here include file creation, initialization, opening, writing, reading, re-instantiation, and deleting. The figure illustrates at least some items illustrated in FIG. 1 the description of like identified elements are applicable to the present figures.

Figure 10A:
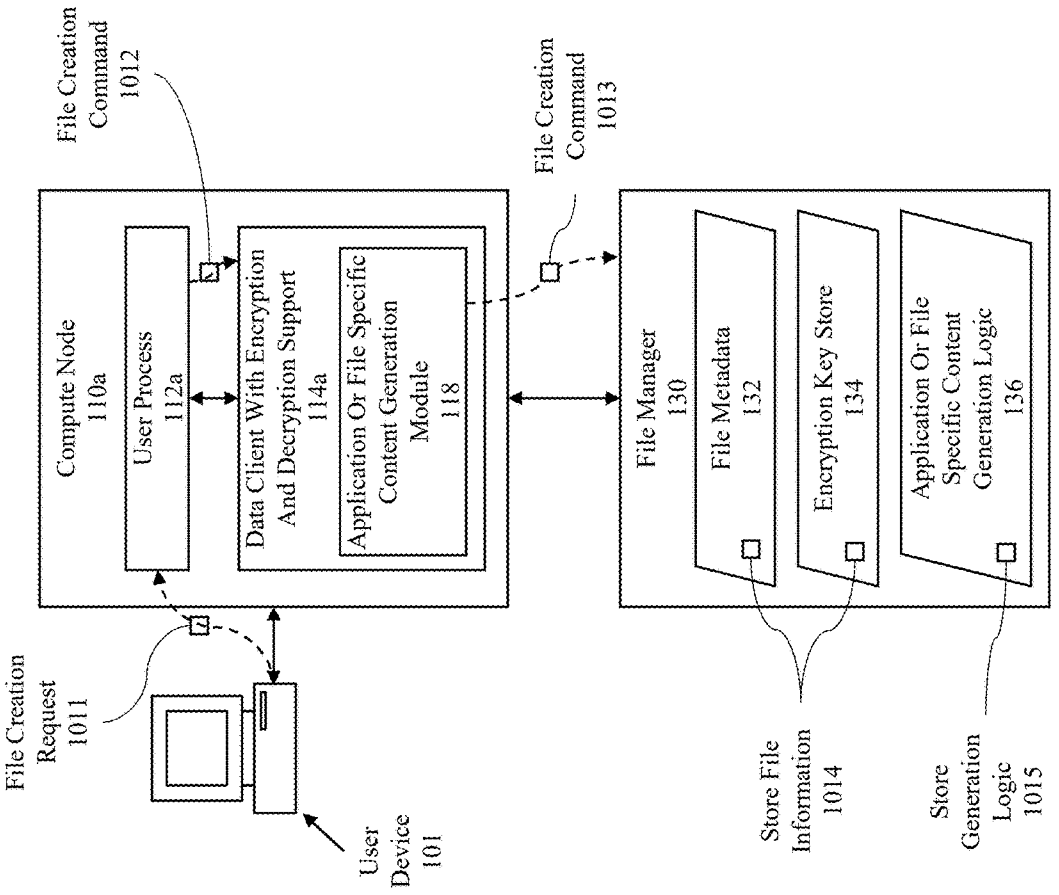
FIGS. 10A-10G provide an illustrative of file operations according to some embodiments.

FIG. 10A illustrates file creation. Specifically, a file creation request can be received from or due to a user action at a user device (see 1011). Such a request is received at a user process (see e.g., 112*a*) on a compute node (see 110*a*) where the user process generates a file creation command that is sent to the data client (see e.g., 1012 and 114*a*). Subsequently, the data client sends the file creation command (or a corresponding command) to the file manager 130. Upon receipt, the file manager (see 130) stores relevant file information (see 1014) such as file metadata (at 132) and an encryption key entry in the encryption key store (see e.g., 134). In some embodiments, generation logic for the file is stored in the application or file specific content generation logic (see e.g., 1015 and 136).

Figure 10B:
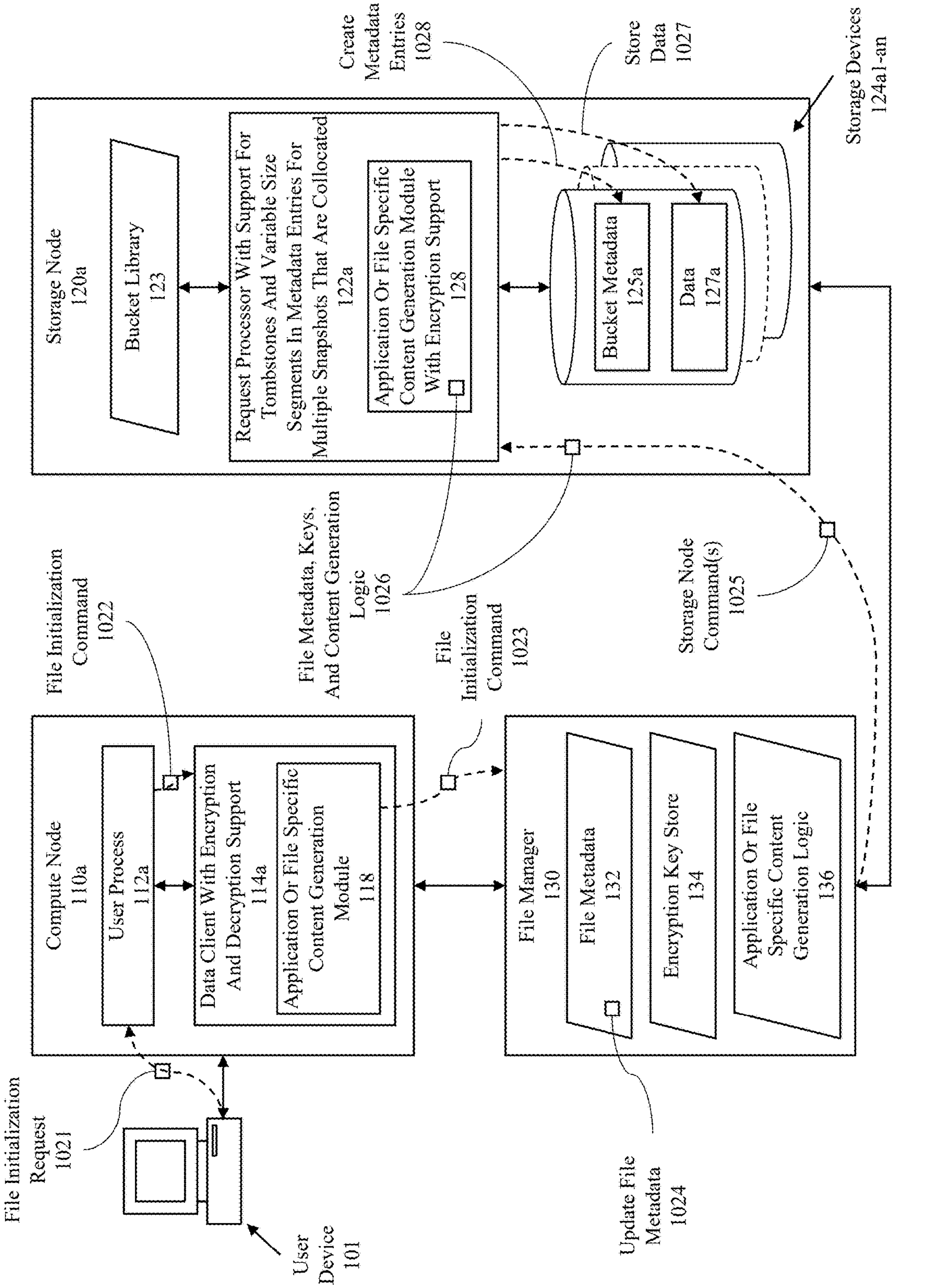

FIG. 10B illustrates file initialization. Specifically, a file initialization request can be received from or due to a user action at a user device (see 1021). Such a request is received at a user process (see e.g., 112*a*) on a compute node (see 110*a*) where the user process generates a file initialization command that is sent to the data client (see e.g., 1022 and 114*a*). Subsequently, the data client sends the file initialization command (or a corresponding command) to the file manager 130.

Upon receipt, the file manager (see 130) may update file metadata (see 1024) such as file metadata (at 132) and then generates one or more storage node commands (see 1025) that are send to the one or more storage nodes (see e.g., 120*a*-*n*). Additionally, the file manager may also sent file metadata, keys, and content generation logic for the file (see 1026) to the storage node(s). In response, the storage node(s) creates metadata entries (see 1028) which are stored in a subset of metadata for a corresponding bucket (see e.g., 125*a*) and may, if necessary, store data (see e.g., 1027) in a corresponding data area (see e.g., 127*a*).

Figure 10C:
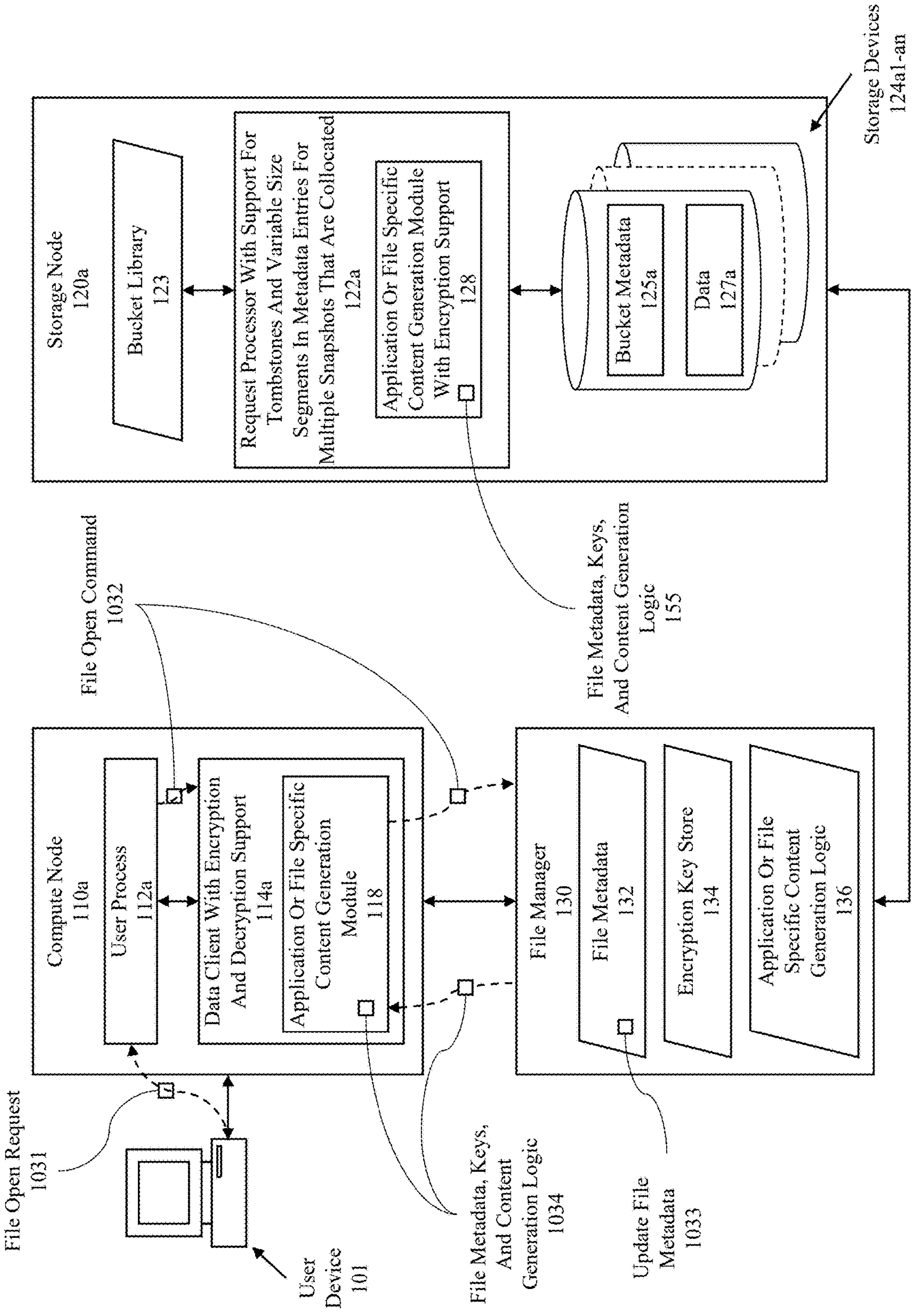

FIG. 10C illustrates file opening. Specifically, a file open request can be received from or due to a user action at a user device (see 1031). Such a request is received at a user process (see e.g., 112*a*) on a compute node (see 110*a*) where the user process generates a file open command that is sent to the data client (see e.g., 1032 and 114*a*). Subsequently, the data client sends the file open command (or a corresponding command) to the file manager 130. Upon receipt, the file manager (see 130) stores relevant file information (see 1033) such as a file lock entry (at 132). Additionally, the file manager may also sent file metadata, keys, and content generation logic for the file (see 1034) to the compute node (see 110*a*) and in some embodiments the storage node(s) (see 120*a*-*n*).

Figure 10D:
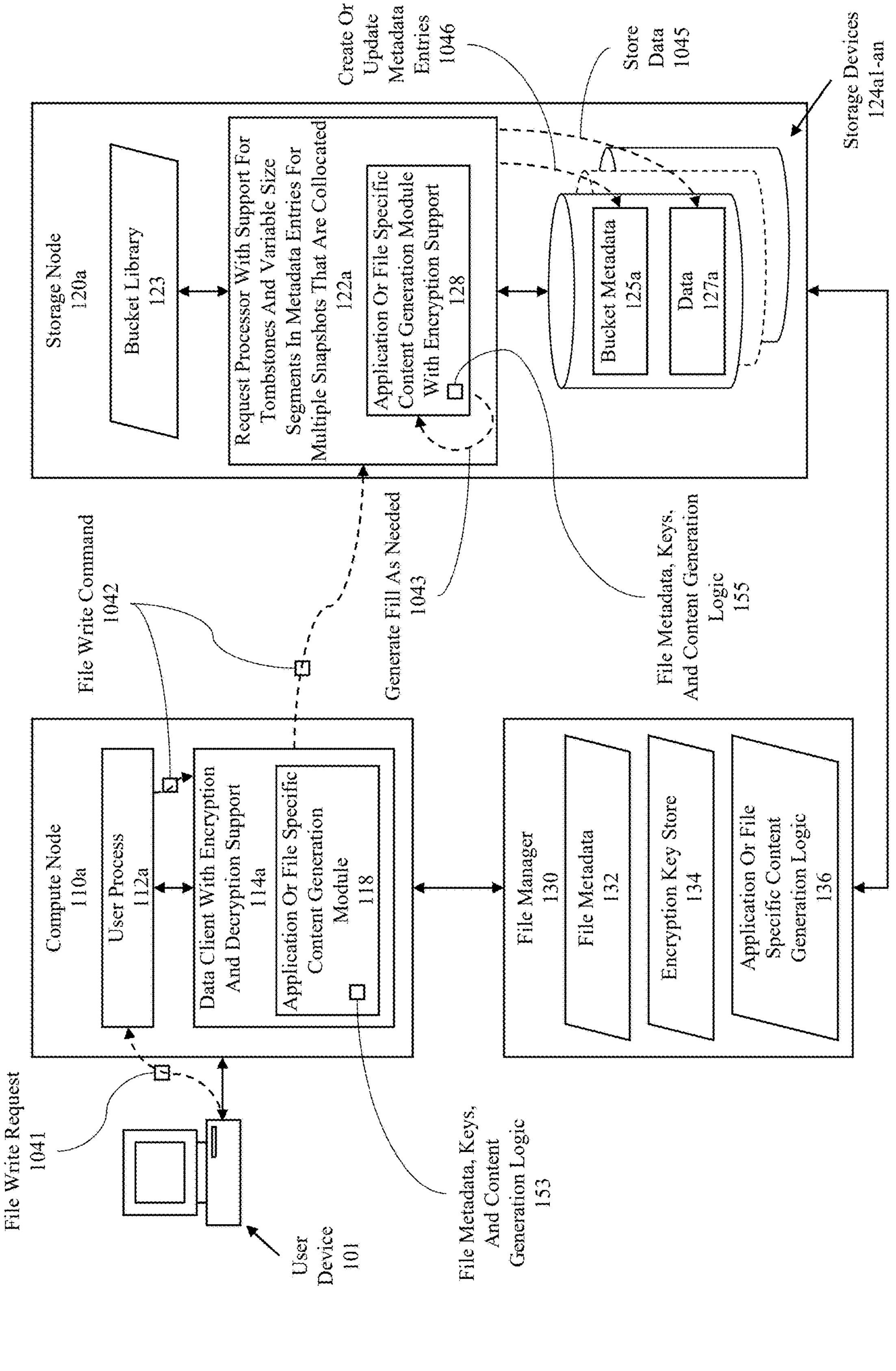

FIG. 10D illustrates a file write. Specifically, a file write request can be received from or due to a user action at a user device (see 1041). Such a request is received at a user process (see e.g., 112*a*) on a compute node (see 110*a*) where the user process generates a file write command that is sent to the data client (see e.g., 1042 and 114*a*). Subsequently, the data client sends the file write command (or a corresponding command) to one or more storage nodes (see e.g., 120*a*-*n*). In response, the storage node(s) create metadata entries (see 1046) which are stored in a subset of metadata for a corresponding bucket (see e.g., 125*a*) and may stores data (see e.g., 1045) in a corresponding data area (see e.g., 127*a*). In some embodiments, the stored data includes at least some fill generated using the file metadata, keys, and application for file specific content generation logic as discussed herein (see e.g., 1043 and 155).

Figure 10E:
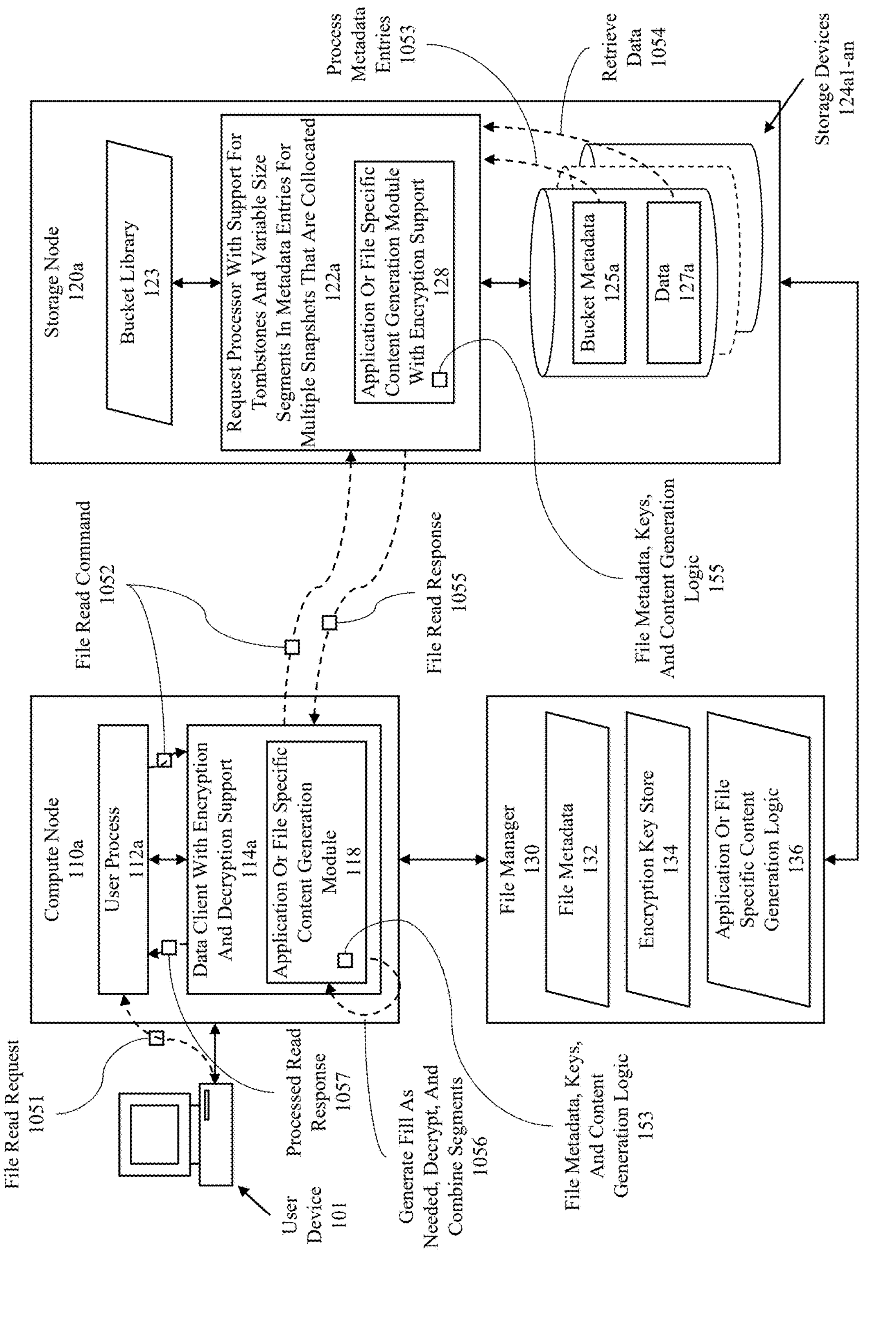

FIG. 10E illustrates a file read. Specifically, a file read request can be received from or due to a user action at a user device (see 1051). Such a request is received at a user process (see e.g., 112*a*) on a compute node (see 110*a*) where the user process generates a file read command that is sent to the data client (see e.g., 1052 and 114*a*). Subsequently, the data client sends the file read command (or a corresponding command) to one or more storage nodes (see e.g., 1052 and 120*a*-*n*). In response, the storage node(s) processes corresponding metadata entries (see 1053) which are stored in a subset of metadata for a corresponding bucket (see e.g., 125*a*) and retrieves the indicated data (see e.g., 1054) in a corresponding data area (see e.g., 127*a*). In some embodiments, the at least one corresponding metadata entry is a tombstone that specifies indicates sparseness.

A file read response is transmitted to the data client (see e.g., 114*a*) on the requesting compute node (see e.g., 1055 and 110*a*). Any number of these read responses may be sent to the compute node and aggregate and combined as discussed herein. Additionally, if any of those read responses indicate that a segment (e.g., logical address range) is sparse (e.g., in a vector that indicates that one or more segments are not materialized), the content generation module (see 118) generates fill using the file metadata and application for file specific content generation logic as discussed herein (see e.g., 1056 and 155). After which the responses and corresponding data segment can be combined (and decrypted if necessary) before sending a read response to the user process (see 1057).

Figure 10F:
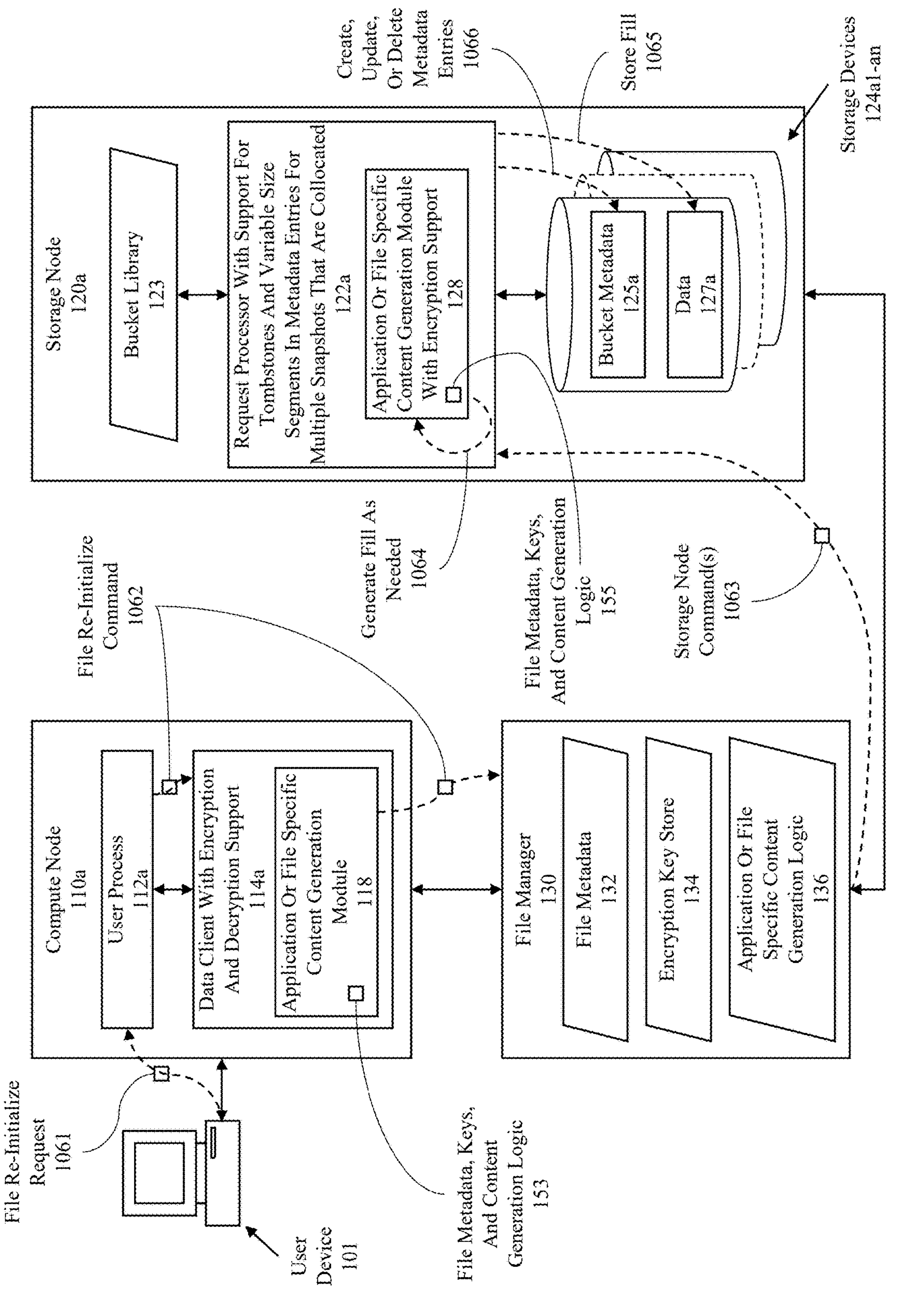

FIG. 10F illustrates a file re-initialization. Specifically, a file re-initialization request can be received from or due to a user action at a user device (see 1061). Such a request is received at a user process (see e.g., 112*a*) on a compute node (see 110*a*) where the user process generates a file re-initialization command that is sent to the data client (see e.g., 1062 and 114*a*). Subsequently, the data client sends the file re-initialization command (or a corresponding command) to the file manager 130.

Upon receipt, the file manager generates one or more storage node commands (see 1063) that are send to the one or more storage nodes (see e.g., 120*a*-*n*). In response, the storage node(s) creates, updates, or deletes metadata entries (see 1066) which are stored in a subset of metadata for a corresponding bucket (see e.g., 125*a*) and may, if necessary, store fill (see e.g., 1065) in a corresponding data area (see e.g., 127*a*) that was generated by the content generation module (see 128) using the file metadata and application for file specific content generation logic as discussed herein (see e.g., 1064 and 155).

Figure 10G:
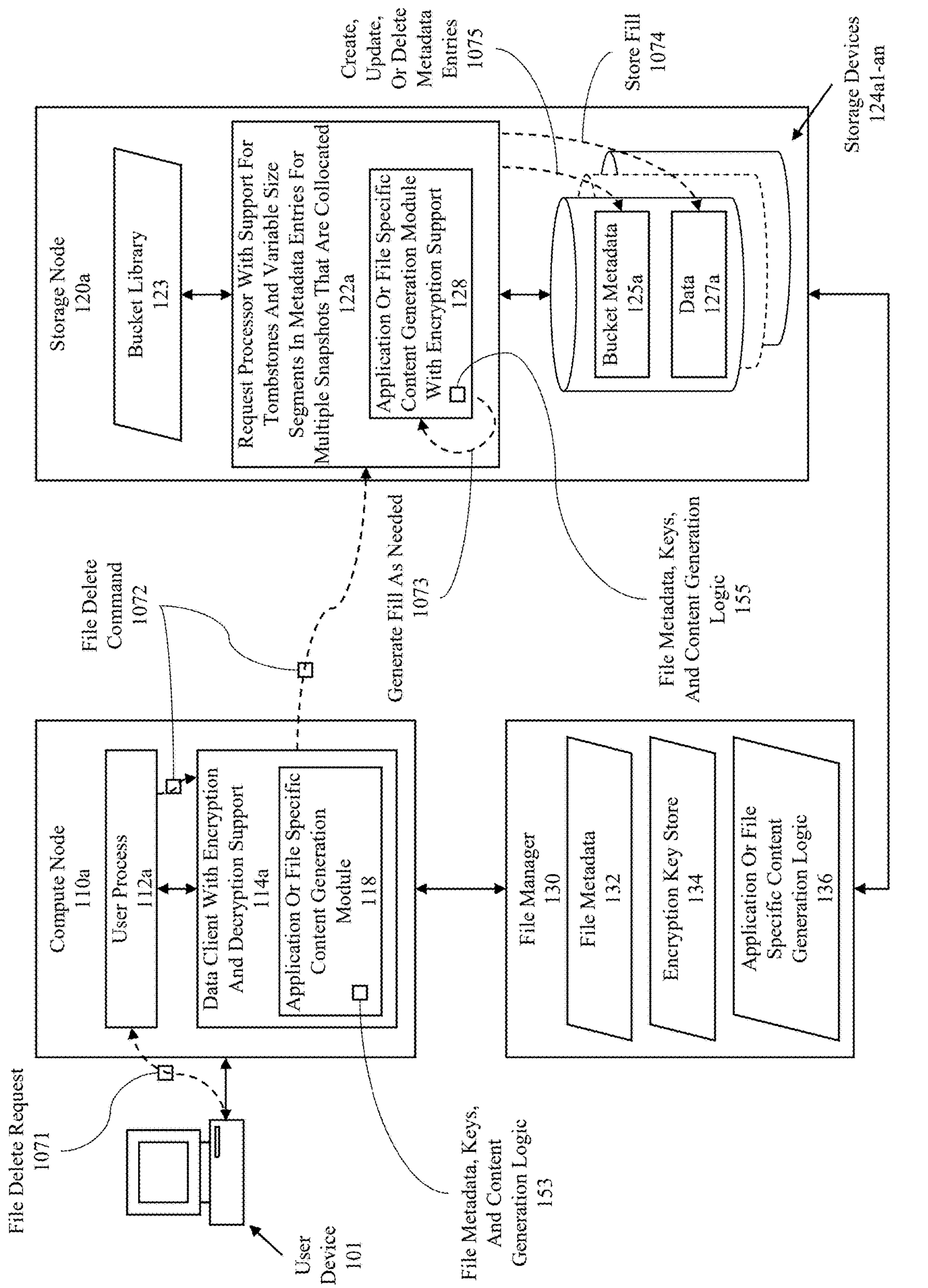

FIG. 10G illustrates a file delete. Specifically, a file delete request can be received from or due to a user action at a user device (see 1071). Such a request is received at a user process (see e.g., 112*a*) on a compute node (see 110*a*). Subsequently, the data client sends the file delete command (or a corresponding command) to one or more storage nodes (see e.g., 120*a-n*). In response, the storage node(s) creates, updates, or deletes metadata entries (see 1075) which are stored in a subset of metadata for a corresponding bucket (see e.g., 125*a*) and may, if necessary, store fill (see e.g., 1074) in a corresponding data area (see e.g., 127*a*) that was generated by the content generation module (see 128) using the file metadata and application for file specific content generation logic as discussed herein (see e.g., 1073 and 155).

Example Dynamic Content Generation Logic

The following discussion provides an illustrative example of content generation logic that can be used for dynamic content generation as provided herein according to some embodiments. The example serves to illustrate only one approach while other approaches may be utilized that are consistent with the disclosure provided herein as an illustrative, and non-restrictive example. Such logic is maintained by the file manager (see e.g., 130) in the application or file specific content generation logic (see e.g., 136).

As provided in this example, the generation logic is associated with an application or file and is generated for a block as needed. For instance, the present example is for a block size of 8 KB. Each block is also associated with a set of information that is constant across all blocks for the application or file (see e.g., ConstantBlockInfo). In the present example, the ConstantBlockInfo comprises a data structure having a block type, a file type, an app instance id, a file id, and a block size. This information is provided by the file manager to the data client and appropriate storage nodes as discussed herein (e.g., upon file initialization or file open).

Additionally, each block may be associated with a unique set of information. For example, a block header (see e.g., BlockHeader) can be defined by a variable block header (see e.g., VariableBlockHeader) and the previously discussed ConstantBlockInfo. As illustrated, the variable block header includes a block number (sequence number of the block) and an SCN (system change number). Similarly, a block footer can be defined by a VariableBlockFooter and the previously discussed ConstantBlockInfo. As provided here, the VariableBlockFooter is a data structure comprising a block number, an SCN, a checksum, one or more tail flags, and a block status. The tail flags and block status values would be known values based on at least file type. A block body can be defined to have size that is equal to the remainder of the block (e.g., the block size less the size of the BlockHeader and the BlockFooter). In the present example, the block body (see e.g., BlockBody) is a data value or a repetition thereof such as a 0, 1, or pattern fill value. To form the complete block structure, the BlockHeader, BlockBody, and BlockFooter are combined (see e.g., ApplicationBlock).

The VariableBlockHeader and VariableBlockFooter would be generated by the corresponding data client or storage node dynamically and as needed based on the file offset and what block number is being generate. For instance, an I/O offset for an access request and a block size are used to determine the block number for the access request—e.g., by dividing the I/O offset by the block size. If that corresponds to a sparse block, the contents can be dynamically generated as needed (e.g., according to the illustrative example below). Additionally, this may be incorporated with a SCN numbers to provide support for multiple versions of the same block.

Illustrative example dynamic content generation logic for a block:

```
#include <stdint.h>
// Configuration: Block Size
#define BLOCK_SIZE 8192                 // 8 KB block size
// Structure: Constant Block Information (Shared across all blocks)
typedef struct {
    uint16_t block_type;                // Type of the block
    uint16_t file_type;                 // Type of the file
    uint32_t app_instance_id;           // Application instance identifier
    uint32_t file_id;                   // File identifier
    uint32_t block_size;
} ConstantBlockInfo;
// Structure: Variable Block Header Information (Unique to each block)
typedef struct {
    uint64_t block_number;              // Sequence number of the block
    uint64_t scn;                       // System Change Number
} VariableBlockHeader;
// Structure: Variable Block Footer Information (Unique to each block)
typedef struct {
    uint64_t block_number;              // Sequence number of the block
    uint64_t scn;                       // System Change Number
    uint64_t checksum;                  // Data integrity checksum
    uint16_t tail_flags;                // Flags for block tail information
    uint32_t block_status;              // Status of the block
} VariableBlockFooter;
// Structure: Block Header
typedef struct {
    VariableBlockHeader variable_info;      // Block-specific header data
    ConstantBlockInfo constant_info;        // Shared block information
} BlockHeader;
// Structure: Block Footer
typedef struct {
    VariableBlockFooter variable_info;      // Block-specific footer data
    ConstantBlockInfo constant_info;        // Shared block information
} BlockFooter;
// Structure: Block Body (Data Payload)
typedef struct {
    uint8_t data [BLOCK_SIZE - sizeof(BlockHeader) - sizeof(Block-
Footer)];
            // Data payload
} BlockBody;
// Structure: Application Block (Complete Block Structure)
typedef struct {
    BlockHeader header;                 // Block header
    BlockBody body;                     // Block data payload
    BlockFooter footer;                 // Block footer
} ApplicationBlock;
```

System Architecture

Figure 11:
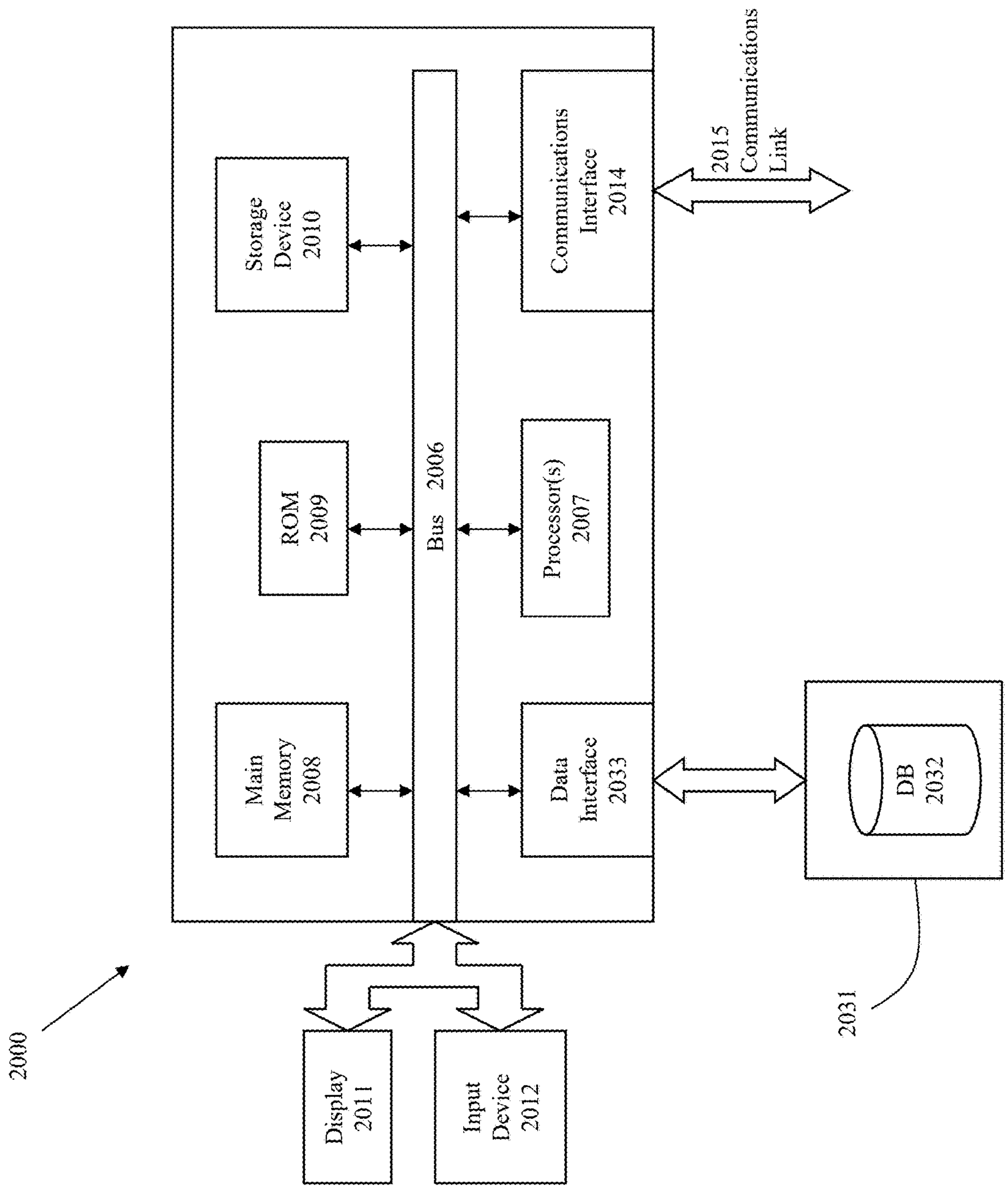
FIG. 11 is a diagram of a computing system suitable for implementing an embodiment of the present disclosure.

FIG. 11 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

Figure 12:
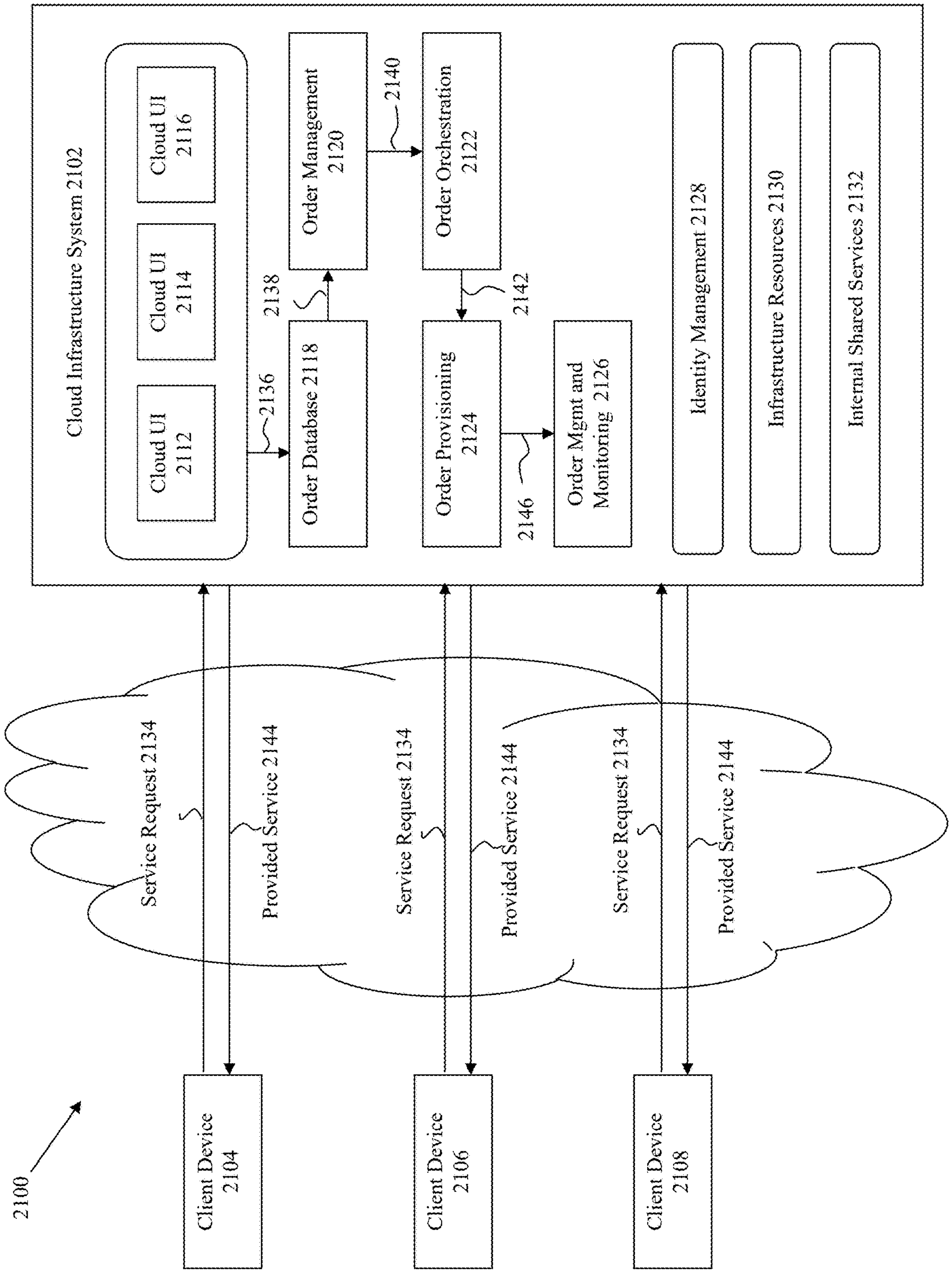
FIG. 12 is a block diagram of one or more components of a system environment in which services may be offered as cloud services, in accordance with an embodiment of the present invention.

FIG. 12 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 11. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or

2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for an approach to providing a distributed data store that addresses at least some of the issues of prior techniques suffer from, such as challenges associated with maintaining sparse data.

The invention claimed is:

1. A computer-implemented method, comprising:

maintaining a cluster comprising a plurality of nodes storing a plurality of objects;

using a plurality of subsets of metadata to manage data for respective objects of the plurality of objects, wherein at least one subset of metadata, in the plurality of subsets of metadata, stores inter-mingled entries for a plurality of snapshots or clones of a corresponding extent; and processing access requests to the data on the plurality of nodes using the plurality of subsets of metadata, wherein a first portion of the data for respective objects is generated using corresponding application or file specific content generation logic.

2. The computer-implemented method of claim 1, wherein the first portion of data is dynamically generated in response to an access request comprising a read request.

3. The computer-implemented method of claim 2, wherein the first portion of data is generated by a data client at a requesting node.

4. The computer-implemented method of claim 1, wherein the first portion of data is dynamically generated by a node of the plurality of nodes in response to an access request comprising a write request and is stored on a storage device of the node, and wherein the first portion of data is encrypted using a file encryption key after being dynamically generated and before being stored on the storage device of the node.

5. The computer-implemented method of claim 1, wherein the application or file specific content generation logic comprises one or more sets of rules for generating fill data that is application or file specific, and wherein the one or more sets of rules comprise a first set of rules for generating a block header, a second set of rules for generating a body, and a third set of rules for generating a block footer.

6. The computer-implemented method of claim 1, wherein the first portion of data is represented on a node of the plurality of nodes using a tombstone entry that does not have a corresponding storage allocation, wherein the tombstone entry represents a logical absence of information in an extent that can be generated dynamically.

7. The method of claim 1, wherein the corresponding extent, and the plurality of snapshots or clones of the corresponding extent, are physically co-located on a single physical storage device of a node in the cluster to define a restricted hardware failure domain for the corresponding extent and a derived object lineage of the corresponding extent.

8. The method of claim 1, further comprising:

maintaining the plurality of subsets of metadata in a multi-tier tree hierarchy on the plurality of nodes without maintaining a persistent storage allocation free map on disk; and during a bootstrapping operation of a node in the cluster, traversing the multi-tier tree hierarchy to dynamically reconstruct an active allocation free map in memory based on disk locations currently allocated to the plurality of objects.

9. The method of claim 1, wherein processing the access requests further comprises:

receiving a read request from a data client hitting an unmaterialized logical address range of an object;

applying a sparse packing technique to omit transmission of raw fill bytes over a network fabric of the cluster at least by generating a sparse vector payload indicating an offset and size of the unmaterialized logical address range; and transmitting the sparse vector payload to the data client, wherein the data client utilizes a localized application or file specific content generation logic to expand and materialize the data blocks locally.

10. The method of claim 1, wherein processing the access requests comprises processing a first access request using the at least one subset of metadata storing the inter-mingled entries, wherein processing the first access request comprises:

instantiating a request vector and a processing vector for the first access request; and setting bits within the request vector for segments that are encompassed by the first access request;

setting bits in the processing vector as processing of the first access request traverses child-to-parent lineages within the inter-mingled entries;

determining if the processing vector matches the request vector; and in response to the processing vector not matching the request vector, until the processing vector matches the request vector, sending one or more write commands for remaining segments to a data access module.

11. A non-transitory computer readable medium having stored thereon a sequence of instructions which, when executed by a processor causes a set of acts comprising:

maintaining a cluster comprising a plurality of nodes storing a plurality of objects;

using a plurality of subsets of metadata to manage data for respective objects of the plurality of objects, wherein at least one subset of metadata, in the plurality of subsets of metadata, stores inter-mingled entries for a plurality of snapshots or clones of a corresponding extent; and processing access requests to the data on the plurality of nodes using the plurality of subsets of metadata, wherein a first portion of the data for respective objects is generated using corresponding application or file specific content generation logic.

12. The non-transitory computer readable medium of claim 11, wherein the first portion of data is dynamically generated in response to an access request comprising a read request.

13. The non-transitory computer readable medium of claim 12, wherein the first portion of data is generated by a data client at a requesting node.

14. The non-transitory computer readable medium of claim 11, wherein the first portion of data is dynamically generated by a node of the plurality of nodes in response to an access request comprising a write request and stored on a storage device of the node, wherein the first portion of data was encrypted using a file encryption key after being dynamically generated and before being stored on the storage device of the node.

15. The non-transitory computer readable medium of claim 11, wherein the application or file specific content generation logic comprises one or more sets of rules for generating fill data that is application or file specific, and wherein the one or more sets of rules comprise a first set of rules for generating a block header, a second set of rules for generating a body, and a third set of rules for generating a block footer.

16. The non-transitory computer readable medium of claim 11, wherein the first portion of data is represented on a node of the plurality of nodes using a tombstone entry that does not have a corresponding storage allocation, wherein the tombstone entry represents a logical absence of information in an extent that can be generated dynamically.

17. A computing system comprising:

a memory to hold a set of instructions; and a computer processor to execute the set of instructions, which when executed cause a set of acts comprising:

maintaining a cluster comprising a plurality of nodes storing a plurality of objects;

using a plurality of subsets of metadata to manage data for respective objects of the plurality of objects, wherein at least one subset of metadata, in the plurality of subsets of metadata, stores inter-mingled entries for a plurality of snapshots or clones of a corresponding extent; and processing access requests to the data on the plurality of nodes using the plurality of subsets of metadata, wherein a first portion of the data for respective objects is generated using corresponding application or file specific content generation logic.

18. The computing system of claim 17, wherein the first portion of data is dynamically generated in response to an access request comprising a read request.

19. The computing system of claim 18, wherein the first portion of data is generated by a data client at a requesting node.

20. The computing system of claim 17, wherein the first portion of data is dynamically generated by a node of the plurality of nodes in response to an access request comprising a write request and is stored on a storage device of the node, and wherein the first portion of data is encrypted using a file encryption key after being dynamically generated and before being stored on the storage device of the node.

* * * * *